US012735016B2

(12) United States Patent
Wehrmann et al.

(10) Patent No.: US 12,735,016 B2
(45) Date of Patent: Sep. 15, 2026

(54) SURGICAL ROBOT WITH SECONDARY BRAKE RELEASE FOR USER ACTUATION

(71) Applicant: Auris Health, Inc., Redwood City, CA (US)

(72) Inventors: Sven Wehrmann, Redwood City, CA (US); Nicholas J. Eyre, Redwood City, CA (US); Nagy Hakim, Redwood City, CA (US); Chase Paul Hathaway, San Francisco, CA (US); Jason W. Currie, Redwood City, CA (US); Colin Allen Wilson, Burlingame, CA (US); Travis C. Covington, Campbell, CA (US)

(73) Assignee: Auris Health, Inc., Santa Clara, CA (US)

( * ) Notice: Subject to any disclaimer, the term of this patent is extended or adjusted under 35 U.S.C. 154(b) by 1014 days.

(21) Appl. No.: 17/859,727

(22) Filed: Jul. 7, 2022

(65) Prior Publication Data

US 2023/0010560 A1 Jan. 12, 2023

Related U.S. Application Data

(60) Provisional application No. 63/219,754, filed on Jul. 8, 2021.

(51) Int. Cl.
*B60T 13/74* (2006.01)
*F16D 121/22* (2012.01)

(52) U.S. Cl.
CPC .......... *B60T 13/741* (2013.01); *B60T 13/746* (2013.01); *F16D 2121/22* (2013.01)

(58) Field of Classification Search
CPC ... B60T 13/741; B60T 13/746; F16D 2121/22
USPC .......... 187/288
See application file for complete search history.

(56) References Cited

U.S. PATENT DOCUMENTS

| | | | | |
|---|---|---|---|---|
| 9,763,741 | B2 | 9/2017 | Alvarez et al. | |
| 10,926,756 | B2 * | 2/2021 | Dastous | G05D 1/0077 |
| 2015/0351995 | A1 * | 12/2015 | Zoss | A61H 1/0244 623/32 |
| 2018/0056985 | A1 * | 3/2018 | Coulter | B62K 5/007 |
| 2018/0289431 | A1 * | 10/2018 | Draper | A61B 34/30 |
| 2018/0289445 | A1 | 10/2018 | Krinninger et al. | |
| 2018/0353246 | A1 | 12/2018 | Ishihara et al. | |
| 2021/0085410 | A1 | 3/2021 | Hassan | |
| 2023/0086127 | A1 | 3/2023 | Ishikawa et al. | |

* cited by examiner

*Primary Examiner* — Kawing Chan
(74) *Attorney, Agent, or Firm* — FBT Gibbons LLP

(57) ABSTRACT

A medical robotic system can include a secondary brake release to allow a user to more easily move the arms of the robotic system when the system is in a power-off or fault state. The robotic system can include a joint and a brake mechanism that can limit motion of the joint. The brake mechanism can include a braking material, a first electromagnetic assembly, and a user-commanded release mechanism. The first electromagnetic assembly can disengage the braking material from an engaged configuration to a disengaged configuration. Further, the user-commanded release mechanism can disengage the braking material from the engaged configuration to the disengaged configuration independent of the first electromagnetic assembly.

20 Claims, 27 Drawing Sheets

154
158
158
152
150
180a
180a
170
174
174
172
156
162

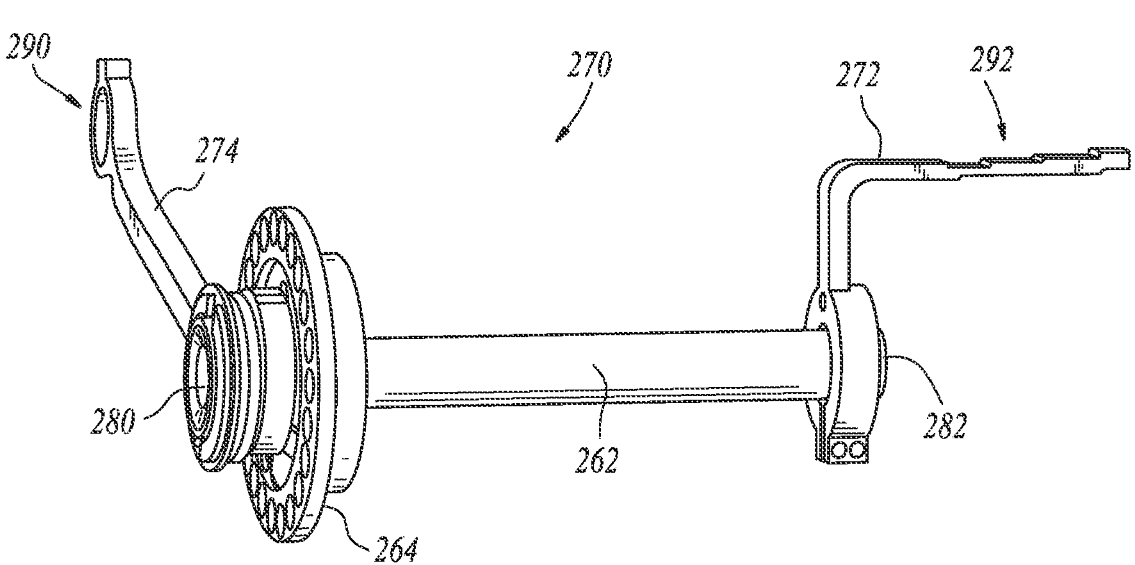
FIG. 26A
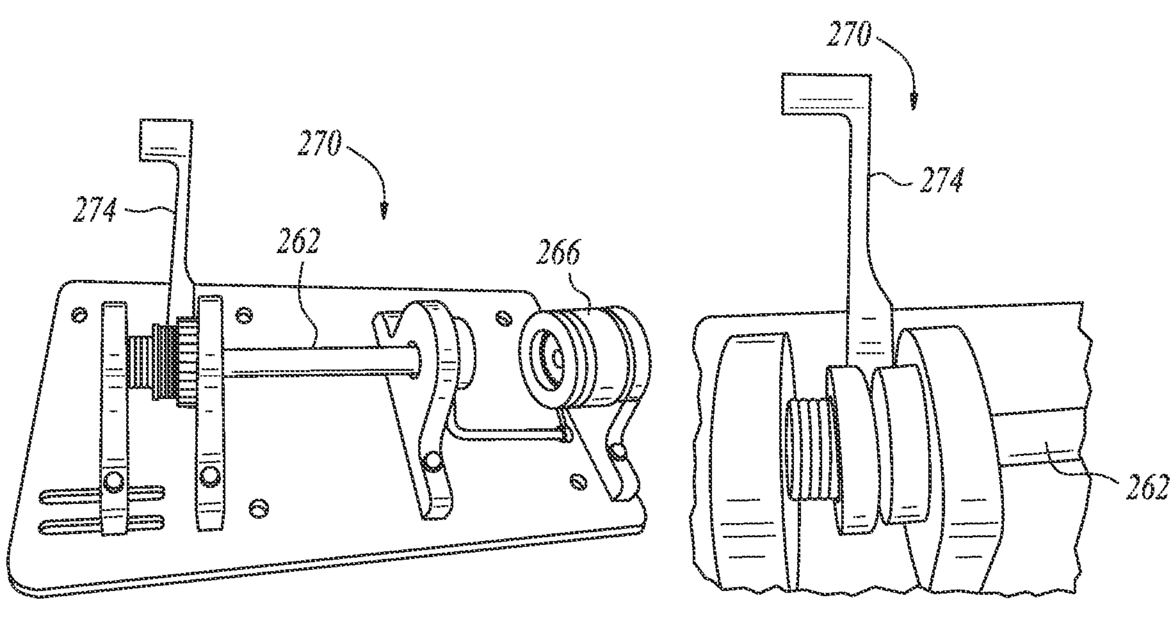
FIG. 26B
FIG. 26C

SURGICAL ROBOT WITH SECONDARY BRAKE RELEASE FOR USER ACTUATION

REFERENCE TO RELATED APPLICATIONS

This application claims priority to U.S. Provisional App. No. 63/219,754, filed Jul. 8, 2021, the entire disclosure of which being incorporated herein by this reference.

TECHNICAL FIELD

Systems and methods disclosed herein related to robotic systems, and more particularly to brake releases for robotic systems.

BACKGROUND

Minimally invasive procedures allow for access to a targeted site within a patient with minimal trauma to the patient. A medical robotic system can provide a mechanism through which one or more robotic arms are used to perform a surgical operation. For example, laparoscopic surgery can allow for surgical access to a patient's cavity through a small incision on the patient's abdomen.

The robotic arms of the robotic system can be coupled to one or more tools, such as a cannula or other devices, that will be used to perform the surgical operation on a patient. Each arm can include one or more joints to position the arms in space. In turn, the joints can be driven by motors and/or transmissions that facilitate the movement of the arms and any tools carried thereby through space, relative to the patient.

The arms of the robotic system, once in a power-off or fault state, will generally be held in place via a braking mechanism (e.g., as "power-off brakes"). The braking mechanism can be provided in the joints and links of the arm, thereby inhibiting movement of the arm. The power-off brakes may be activated automatically by a controller or control system of the robotic system, such as upon triggering of a fault (e.g., if a sensor were to break) or upon loss of power to the system.

SUMMARY

In some predicate systems, these power-off brakes may be sufficient to maintain the arm in a given position while permitting the arm to be "back-drivable" by the user. When the arm is back-driven by the user, the user would apply a force greater than the force of the power-off brake that is used to maintain a joint or link in a given position. As a result, the user would be able to articulate the arm to a given desired position even when the power-off brakes are activated in the arms. In addition, such robotic system can include a primary brake release, which can be activated by the user and implemented by the controller or control system.

In accordance with some embodiments disclosed herein is the realization that as robotic systems developed by the present Applicant continue to evolve and provide functionality and durability hitherto unavailable, important and unexpected changes to the structure and architecture of the robotic system were discovered and found to provide surprisingly important and advantageous results in facilitating the effective and simple operations of the robotic system. Further, in accordance with some embodiments disclosed herein is the realization that the controller or control system of the robotic system may be rendered inoperable or otherwise unavailable to initiate the primary brake release. As such, the present disclosure addresses these and other challenges.

For example, due to the unique architecture of embodiments of robotic systems developed by the present Applicant, unique and innovative architecture has made it possible for components of the system to include joints and breaks that are far sturdier than predicate counterparts. These joints and brakes can be designed to support very heavy weight and cannot simply be overcome by manual user-applied force. In general, many of these joints cannot be back-driven because they support heavy loads.

Accordingly, in addition to a primary brake release that may be available to release the power-off brake system, as discussed above, some embodiments disclosed herein provide a robotic system that incorporates a secondary brake release mechanism that can allow the user to release the power-off brake to permit the user to, for example, more easily manipulate the position of a robotic arm while the system is in a power-off or faulted state.

Advantageously, some embodiments of a secondary brake release mechanism can allow a user to perform one of a variety of operations or procedures, including accessing a patient on the bed of the system, without impacting the connection between the power-off break and the motor driver. Moreover, the integrity and function of the system can be more securely protected and maintained while providing flexibility to the user in operating the system. Such secondary brake release mechanisms can provide a solution to the above-noted challenges and have not been disclosed or implemented in predicate systems given that such systems did not implement or otherwise contemplate the unique improvements of Applicant's new technology, until the discovery and development of embodiments of the secondary brake release mechanisms.

In accordance with some embodiments, the secondary brake release mechanism can be implemented as a mechanical brake release mechanism and/or as an electrical brake release mechanism.

In some embodiments, the mechanical and/or electrical brake release mechanism can release a brake mechanism that is associated with and/or coupled to a main joint that enables translation of an adjustable bar relative to the table of the system. In addition to or alternatively, some embodiments of the mechanical and/or electrical brake release mechanism can be used to release a brake mechanism that is associated with and/or coupled to one or more joints beyond the main joint. Further, a mechanical and/or electrical brake release mechanism can be incorporated into a single robotic arm, a pair of robotic arms that operate in tandem, and/or combinations thereof.

In some embodiments, a mechanical brake release mechanism can release a brake mechanism associated with and/or coupled to one or more joints or links of a medical robotic system. The mechanical brake release mechanism can be configured to integrate a user-accessible lever into the brake mechanism that is able to overpower the spring force. In some embodiments, the mechanical brake release mechanism can be configured to mechanically overdrive the brake mechanism with a Bowden cable-actuated system to allow for a remote handle. For example, the robotic surgical system can comprise a handle or lever, e.g., behind an access panel on the robot, for emergency patient or user access in order to release the brake mechanism as needed in a procedure.

In some embodiments, an electrical brake release mechanism can release a brake mechanism associated with and/or coupled to one or more joints or links of a medical robotic system. The electrical brake release mechanism could comprise a battery back-up to provide redundancy even in case of system power failure. The electrical brake release mechanism could comprise a power source that is parallel to a brake coil of the brake mechanism, and/or a secondary solenoid coil in the brake that is completely parallel and separately actuated for further redundancy.

Advantageously, these systems can provide an added level of safety to a robot that interacts with humans, by allowing joints to be completely unlocked and repositioned even under complete electrical or software failure of the robot.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIGS. 26A-26C illustrate aspects of a mechanical brake release mechanism, in accordance with some embodiments.

DETAILED DESCRIPTION

1. Overview

Aspects of the present disclosure may be integrated into a robotically enabled medical system capable of performing a variety of medical procedures, including both minimally invasive, such as laparoscopy, and non-invasive, such as endoscopy, procedures. Among endoscopy procedures, the system may be capable of performing bronchoscopy, ureteroscopy, gastroscopy, etc.

In addition to performing the breadth of procedures, the system may provide additional benefits, such as enhanced imaging and guidance to assist the physician. Additionally, the system may provide the physician with the ability to perform the procedure from an ergonomic position without the need for awkward arm motions and positions. Still further, the system may provide the physician with the ability to perform the procedure with improved ease of use such that one or more of the instruments of the system can be controlled by a single user.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

A. Robotic System—Cart

Figure 1:
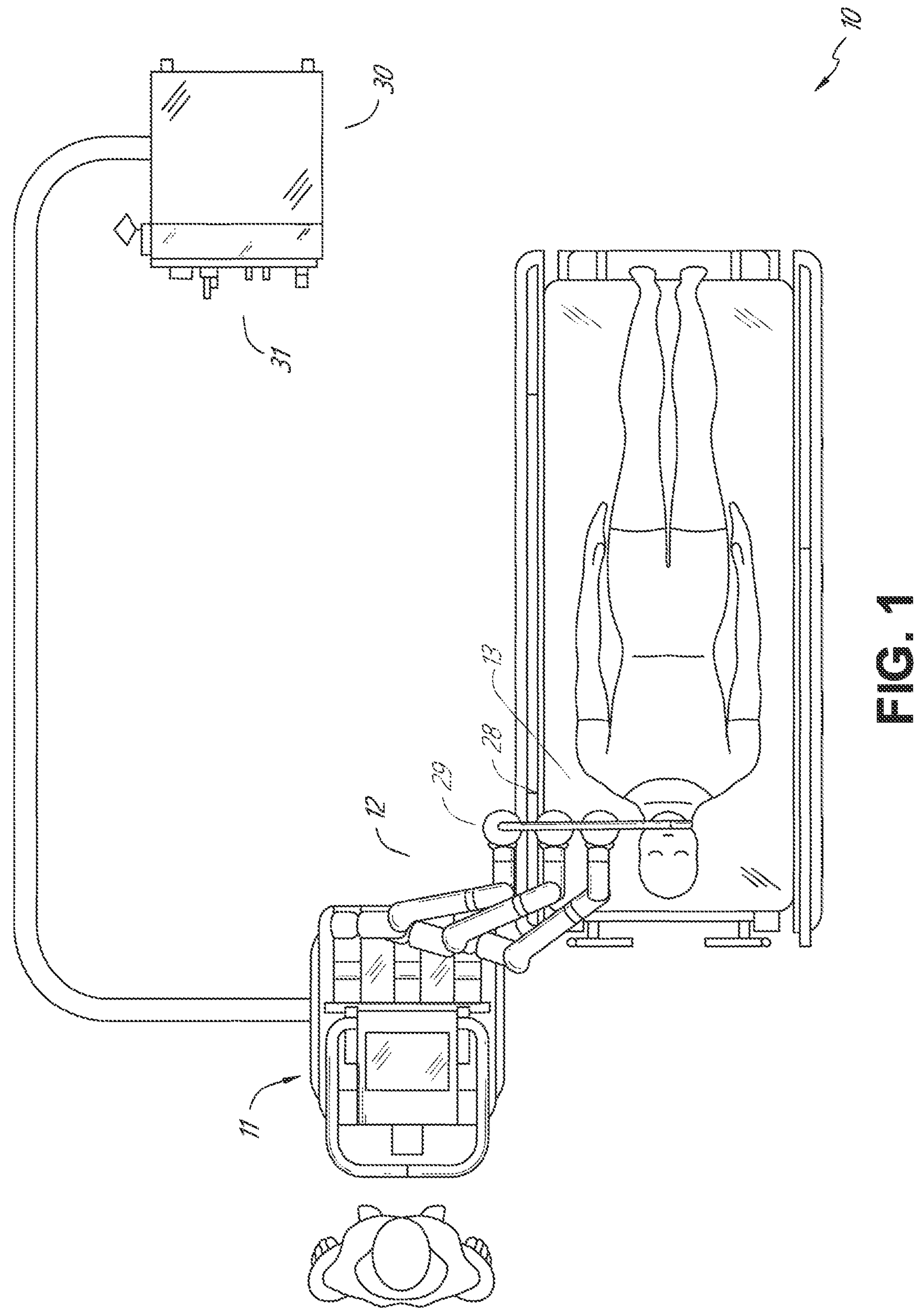
FIG. 1 illustrates an embodiment of a cart-based robotic system arranged for diagnostic and/or therapeutic bronchoscopy procedure(s).
Figure 2:
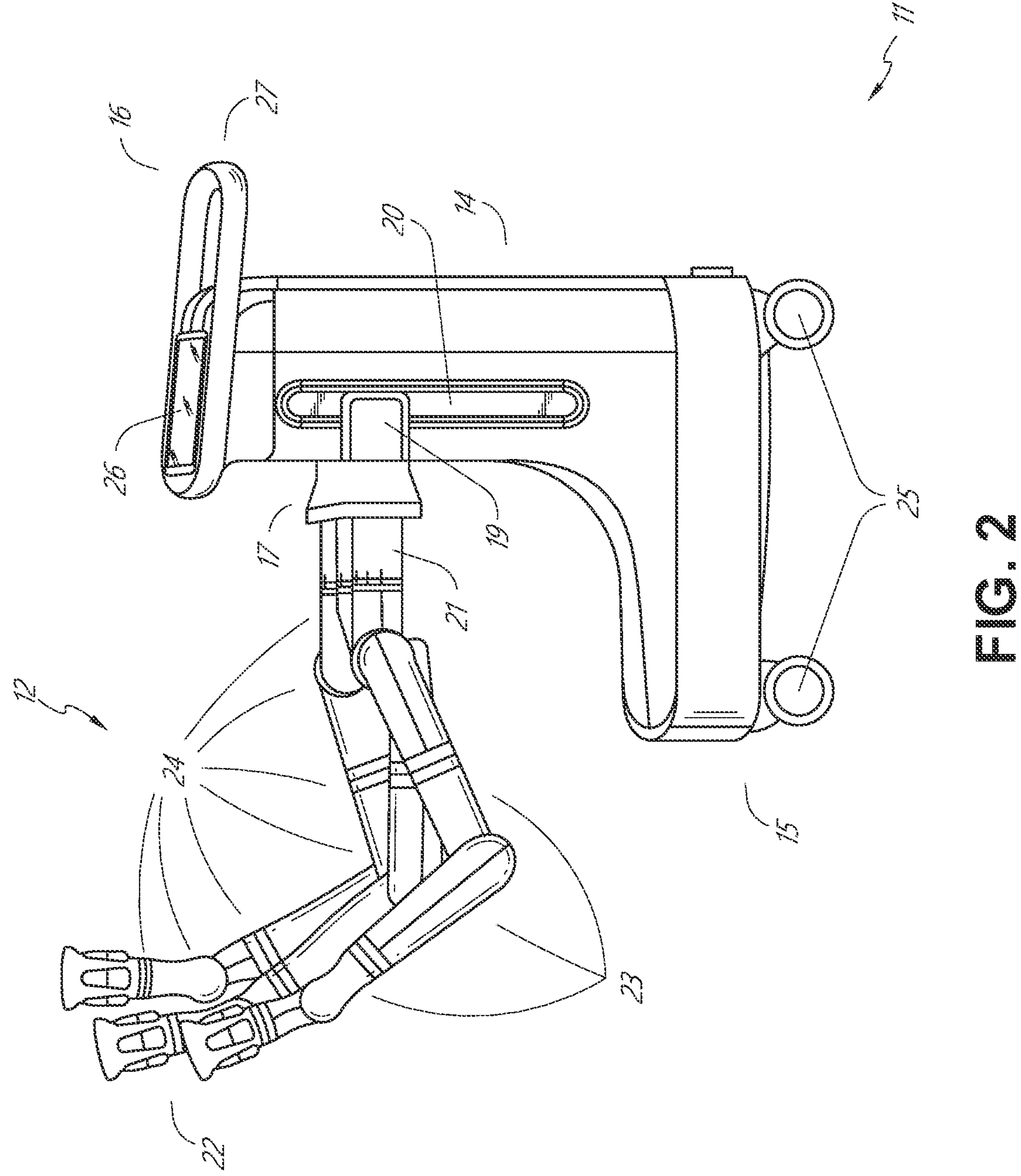
FIG. 2 depicts further aspects of the robotic system of FIG. 1.

The robotically enabled medical system may be configured in a variety of ways depending on the particular procedure. FIG. 1 illustrates an embodiment of a cart-based robotically enabled system 10 arranged for a diagnostic and/or therapeutic bronchoscopy procedure. During a bronchoscopy, the system 10 may comprise a cart 11 having one or more robotic arms 12 to deliver a medical instrument, such as a steerable endoscope 13, which may be a procedure-specific bronchoscope for bronchoscopy, to a natural orifice access point (i.e., the mouth of the patient positioned on a table in the present example) to deliver diagnostic and/or therapeutic tools. As shown, the cart 11 may be positioned proximate to the patient's upper torso in order to provide access to the access point. Similarly, the robotic arms 12 may be actuated to position the bronchoscope relative to the access point. The arrangement in FIG. 1 may also be utilized when performing a gastro-intestinal (GI)

procedure with a gastroscope, a specialized endoscope for GI procedures. FIG. 2 depicts an example embodiment of the cart in greater detail.

With continued reference to FIG. 1, once the cart 11 is properly positioned, the robotic arms 12 may insert the steerable endoscope 13 into the patient robotically, manually, or a combination thereof. As shown, the steerable endoscope 13 may comprise at least two telescoping parts, such as an inner leader portion and an outer sheath portion, each portion coupled to a separate instrument driver from the set of instrument drivers 28, each instrument driver coupled to the distal end of an individual robotic arm. This linear arrangement of the instrument drivers 28, which facilitates coaxially aligning the leader portion with the sheath portion, creates a "virtual rail" 29 that may be repositioned in space by manipulating the one or more robotic arms 12 into different angles and/or positions. The virtual rails described herein are depicted in the Figures using dashed lines, and accordingly the dashed lines do not depict any physical structure of the system. Translation of the instrument drivers 28 along the virtual rail 29 telescopes the inner leader portion relative to the outer sheath portion or advances or retracts the endoscope 13 from the patient. The angle of the virtual rail 29 may be adjusted, translated, and pivoted based on clinical application or physician preference. For example, in bronchoscopy, the angle and position of the virtual rail 29 as shown represents a compromise between providing physician access to the endoscope 13 while minimizing friction that results from bending the endoscope 13 into the patient's mouth.

The endoscope 13 may be directed down the patient's trachea and lungs after insertion using precise commands from the robotic system until reaching the target destination or operative site. In order to enhance navigation through the patient's lung network and/or reach the desired target, the endoscope 13 may be manipulated to telescopically extend the inner leader portion from the outer sheath portion to obtain enhanced articulation and greater bend radius. The use of separate instrument drivers 28 also allows the leader portion and sheath portion to be driven independent of each other.

For example, the endoscope 13 may be directed to deliver a biopsy needle to a target, such as, for example, a lesion or nodule within the lungs of a patient. The needle may be deployed down a working channel that runs the length of the endoscope to obtain a tissue sample to be analyzed by a pathologist. Depending on the pathology results, additional tools may be deployed down the working channel of the endoscope for additional biopsies. After identifying a nodule to be malignant, the endoscope 13 may endoscopically deliver tools to resect the potentially cancerous tissue. In some instances, diagnostic and therapeutic treatments can be delivered in separate procedures. In those circumstances, the endoscope 13 may also be used to deliver a fiducial to "mark" the location of the target nodule as well. In other instances, diagnostic and therapeutic treatments may be delivered during the same procedure.

The system 10 may also include a movable tower 30, which may be connected via support cables to the cart 11 to provide support for controls, electronics, fluidics, optics, sensors, and/or power to the cart 11. Placing such functionality in the tower 30 allows for a smaller form factor cart 11 that may be more easily adjusted and/or re-positioned by an operating physician and his/her staff. Additionally, the division of functionality between the cart/table and the support tower 30 reduces operating room clutter and facilitates improving clinical workflow. While the cart 11 may be positioned close to the patient, the tower 30 may be stowed in a remote location to stay out of the way during a procedure.

In support of the robotic systems described above, the tower 30 may include component(s) of a computer-based control system that stores computer program instructions, for example, within a non-transitory computer-readable storage medium such as a persistent magnetic storage drive, solid state drive, etc. The execution of those instructions, whether the execution occurs in the tower 30 or the cart 11, may control the entire system or sub-system(s) thereof. For example, when executed by a processor of the computer system, the instructions may cause the components of the robotics system to actuate the relevant carriages and arm mounts, actuate the robotics arms, and control the medical instruments. For example, in response to receiving the control signal, the motors in the joints of the robotics arms may position the arms into a certain posture.

The tower 30 may also include a pump, flow meter, valve control, and/or fluid access in order to provide controlled irrigation and aspiration capabilities to the system that may be deployed through the endoscope 13. These components may also be controlled using the computer system of tower 30. In some embodiments, irrigation and aspiration capabilities may be delivered directly to the endoscope 13 through separate cable(s).

The tower 30 may include a voltage and surge protector designed to provide filtered and protected electrical power to the cart 11, thereby avoiding placement of a power transformer and other auxiliary power components in the cart 11, resulting in a smaller, more moveable cart 11.

The tower 30 may also include support equipment for the sensors deployed throughout the robotic system 10. For example, the tower 30 may include opto-electronics equipment for detecting, receiving, and processing data received from the optical sensors or cameras throughout the robotic system 10. In combination with the control system, such opto-electronics equipment may be used to generate real-time images for display in any number of consoles deployed throughout the system, including in the tower 30. Similarly, the tower 30 may also include an electronic subsystem for receiving and processing signals received from deployed electromagnetic (EM) sensors. The tower 30 may also be used to house and position an EM field generator for detection by EM sensors in or on the medical instrument.

The tower 30 may also include a console 31 in addition to other consoles available in the rest of the system, e.g., console mounted on top of the cart. The console 31 may include a user interface and a display screen, such as a touchscreen, for the physician operator. Consoles in system 10 are generally designed to provide both robotic controls as well as pre-operative and real-time information of the procedure, such as navigational and localization information of the endoscope 13. When the console 31 is not the only console available to the physician, it may be used by a second operator, such as a nurse, to monitor the health or vitals of the patient and the operation of system, as well as provide procedure-specific data, such as navigational and localization information. In other embodiments, the console 30 is housed in a body that is separate from the tower 30.

The tower 30 may be coupled to the cart 11 and endoscope 13 through one or more cables or connections (not shown). In some embodiments, the support functionality from the tower 30 may be provided through a single cable to the cart 11, simplifying and de-cluttering the operating room. In other embodiments, specific functionality may be coupled in separate cabling and connections. For example, while power may be provided through a single power cable to the cart, the support for controls, optics, fluidics, and/or navigation may be provided through a separate cable.

FIG. 2 provides a detailed illustration of an embodiment of the cart from the cart-based robotically enabled system shown in FIG. 1. The cart 11 generally includes an elongated support structure 14 (often referred to as a "column"), a cart base 15, and a console 16 at the top of the column 14. The column 14 may include one or more carriages, such as a carriage 17 (alternatively "arm support") for supporting the deployment of one or more robotic arms 12 (three shown in FIG. 2). The carriage 17 may include individually configurable arm mounts that rotate along a perpendicular axis to adjust the base of the robotic arms 12 for better positioning relative to the patient. The carriage 17 also includes a carriage interface 19 that allows the carriage 17 to vertically translate along the column 14.

The carriage interface 19 is connected to the column 14 through slots, such as slot 20, that are positioned on opposite sides of the column 14 to guide the vertical translation of the carriage 17. The slot 20 contains a vertical translation interface to position and hold the carriage at various vertical heights relative to the cart base 15. Vertical translation of the carriage 17 allows the cart 11 to adjust the reach of the robotic arms 12 to meet a variety of table heights, patient sizes, and physician preferences. Similarly, the individually configurable arm mounts on the carriage 17 allow the robotic arm base 21 of robotic arms 12 to be angled in a variety of configurations.

In some embodiments, the slot 20 may be supplemented with slot covers that are flush and parallel to the slot surface to prevent dirt and fluid ingress into the internal chambers of the column 14 and the vertical translation interface as the carriage 17 vertically translates. The slot covers may be deployed through pairs of spring spools positioned near the vertical top and bottom of the slot 20. The covers are coiled within the spools until deployed to extend and retract from their coiled state as the carriage 17 vertically translates up and down. The spring-loading of the spools provides force to retract the cover into a spool when carriage 17 translates towards the spool, while also maintaining a tight seal when the carriage 17 translates away from the spool. The covers may be connected to the carriage 17 using, for example, brackets in the carriage interface 19 to ensure proper extension and retraction of the cover as the carriage 17 translates.

The column 14 may internally comprise mechanisms, such as gears and motors, that are designed to use a vertically aligned lead screw to translate the carriage 17 in a mechanized fashion in response to control signals generated in response to user inputs, e.g., inputs from the console 16.

The robotic arms 12 may generally comprise robotic arm bases 21 and end effectors 22, separated by a series of linkages 23 that are connected by a series of joints 24, each joint comprising an independent actuator, each actuator comprising an independently controllable motor. Each independently controllable joint represents an independent degree of freedom available to the robotic arm. Each of the arms 12 have seven joints, and thus provide seven degrees of freedom. A multitude of joints result in a multitude of degrees of freedom, allowing for "redundant" degrees of freedom. Redundant degrees of freedom allow the robotic arms 12 to position their respective end effectors 22 at a specific position, orientation, and trajectory in space using different linkage positions and joint angles. This allows for the system to position and direct a medical instrument from a desired point in space while allowing the physician to move the arm joints into a clinically advantageous position away from the patient to create greater access, while avoiding arm collisions.

The cart base 15 balances the weight of the column 14, carriage 17, and arms 12 over the floor. Accordingly, the cart base 15 houses heavier components, such as electronics, motors, power supply, as well as components that either enable movement and/or immobilize the cart. For example, the cart base 15 includes rollable wheel-shaped casters 25 that allow for the cart to easily move around the room prior to a procedure. After reaching the appropriate position, the casters 25 may be immobilized using wheel locks to hold the cart 11 in place during the procedure.

Positioned at the vertical end of column 14, the console 16 allows for both a user interface for receiving user input and a display screen (or a dual-purpose device such as, for example, a touchscreen 26) to provide the physician user with both pre-operative and intra-operative data. Potential pre-operative data on the touchscreen 26 may include pre-operative plans, navigation and mapping data derived from pre-operative computerized tomography (CT) scans, and/or notes from pre-operative patient interviews. Intra-operative data on display may include optical information provided from the tool, sensor and coordinate information from sensors, as well as vital patient statistics, such as respiration, heart rate, and/or pulse. The console 16 may be positioned and tilted to allow a physician to access the console from the side of the column 14 opposite carriage 17. From this position, the physician may view the console 16, robotic arms 12, and patient while operating the console 16 from behind the cart 11. As shown, the console 16 also includes a handle 27 to assist with maneuvering and stabilizing cart 11.

Figure 3:
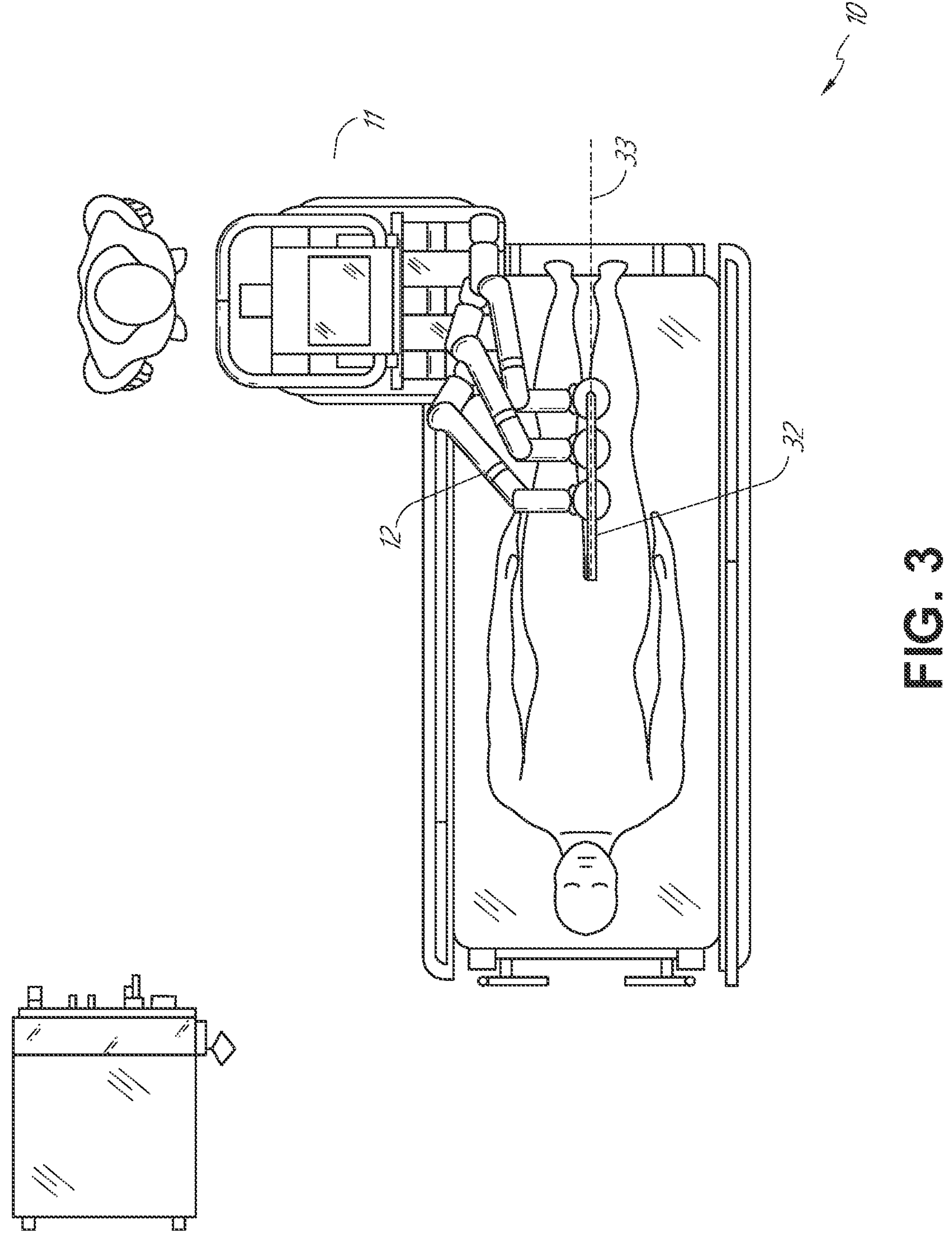
FIG. 3 illustrates an embodiment of the robotic system of FIG. 1 arranged for ureteroscopy.

FIG. 3 illustrates an embodiment of a robotically enabled system 10 arranged for ureteroscopy. In a ureteroscopic procedure, the cart 11 may be positioned to deliver a ureteroscope 32, a procedure-specific endoscope designed to traverse a patient's urethra and ureter, to the lower abdominal area of the patient. In a ureteroscopy, it may be desirable for the ureteroscope 32 to be directly aligned with the patient's urethra to reduce friction and forces on the sensitive anatomy in the area. As shown, the cart 11 may be aligned at the foot of the table to allow the robotic arms 12 to position the ureteroscope 32 for direct linear access to the patient's urethra. From the foot of the table, the robotic arms 12 may insert the ureteroscope 32 along the virtual rail 33 directly into the patient's lower abdomen through the urethra.

After insertion into the urethra, using similar control techniques as in bronchoscopy, the ureteroscope 32 may be navigated into the bladder, ureters, and/or kidneys for diagnostic and/or therapeutic applications. For example, the ureteroscope 32 may be directed into the ureter and kidneys to break up kidney stone build up using a laser or ultrasonic lithotripsy device deployed down the working channel of the ureteroscope 32. After lithotripsy is complete, the resulting stone fragments may be removed using baskets deployed down the ureteroscope 32.

Figure 4:
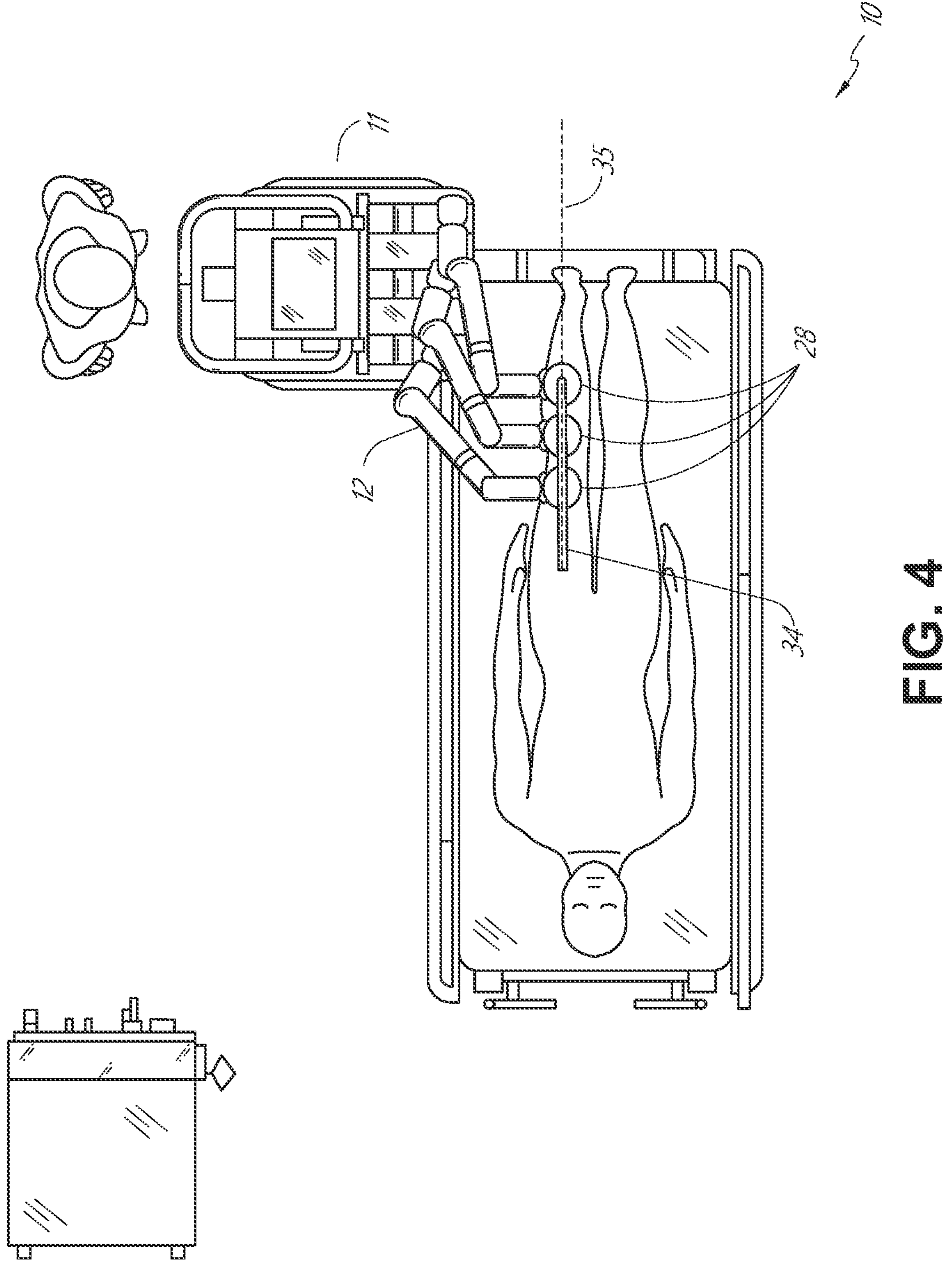
FIG. 4 illustrates an embodiment of the robotic system of FIG. 1 arranged for a vascular procedure.

FIG. 4 illustrates an embodiment of a robotically enabled system similarly arranged for a vascular procedure. In a vascular procedure, the system 10 may be configured such that the cart 11 may deliver a medical instrument 34, such as a steerable catheter, to an access point in the femoral artery in the patient's leg. The femoral artery presents both a larger diameter for navigation as well as a relatively less circuitous and tortuous path to the patient's heart, which simplifies navigation. As in a ureteroscopic procedure, the cart 11 may be positioned towards the patient's legs and lower abdomen to allow the robotic arms 12 to provide a virtual rail 35 with direct linear access to the femoral artery access point in the patient's thigh/hip region. After insertion into the artery, the medical instrument 34 may be directed and inserted by translating the instrument drivers 28. Alternatively, the cart may be positioned around the patient's upper abdomen in order to reach alternative vascular access points, such as, for example, the carotid and brachial arteries near the shoulder and wrist.

B. Robotic System—Table

Figure 5:
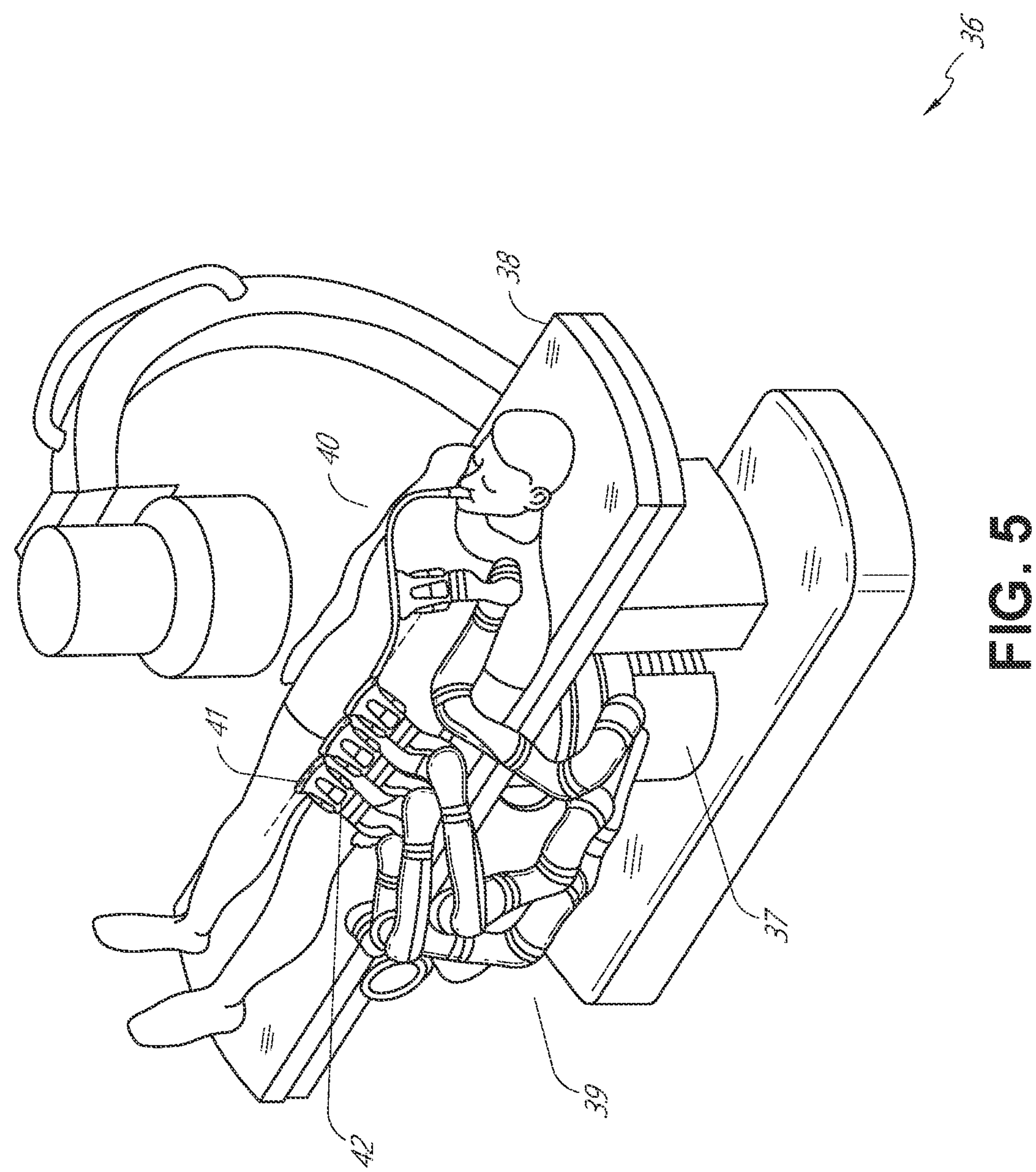
FIG. 5 illustrates an embodiment of a table-based robotic system arranged for a bronchoscopy procedure.

Embodiments of the robotically enabled medical system may also incorporate the patient's table. Incorporation of the table reduces the amount of capital equipment within the operating room by removing the cart, which allows greater access to the patient. FIG. 5 illustrates an embodiment of such a robotically enabled system arranged for a bronchoscopy procedure. System 36 includes a support structure or column 37 for supporting platform 38 (shown as a "table" or "bed") over the floor. Much like in the cart-based systems, the end effectors of the robotic arms 39 of the system 36 comprise instrument drivers 42 that are designed to manipulate an elongated medical instrument, such as a bronchoscope 40 in FIG. 5, through or along a virtual rail 41 formed from the linear alignment of the instrument drivers 42. In practice, a C-arm for providing fluoroscopic imaging may be positioned over the patient's upper abdominal area by placing the emitter and detector around table 38.

Figure 6:
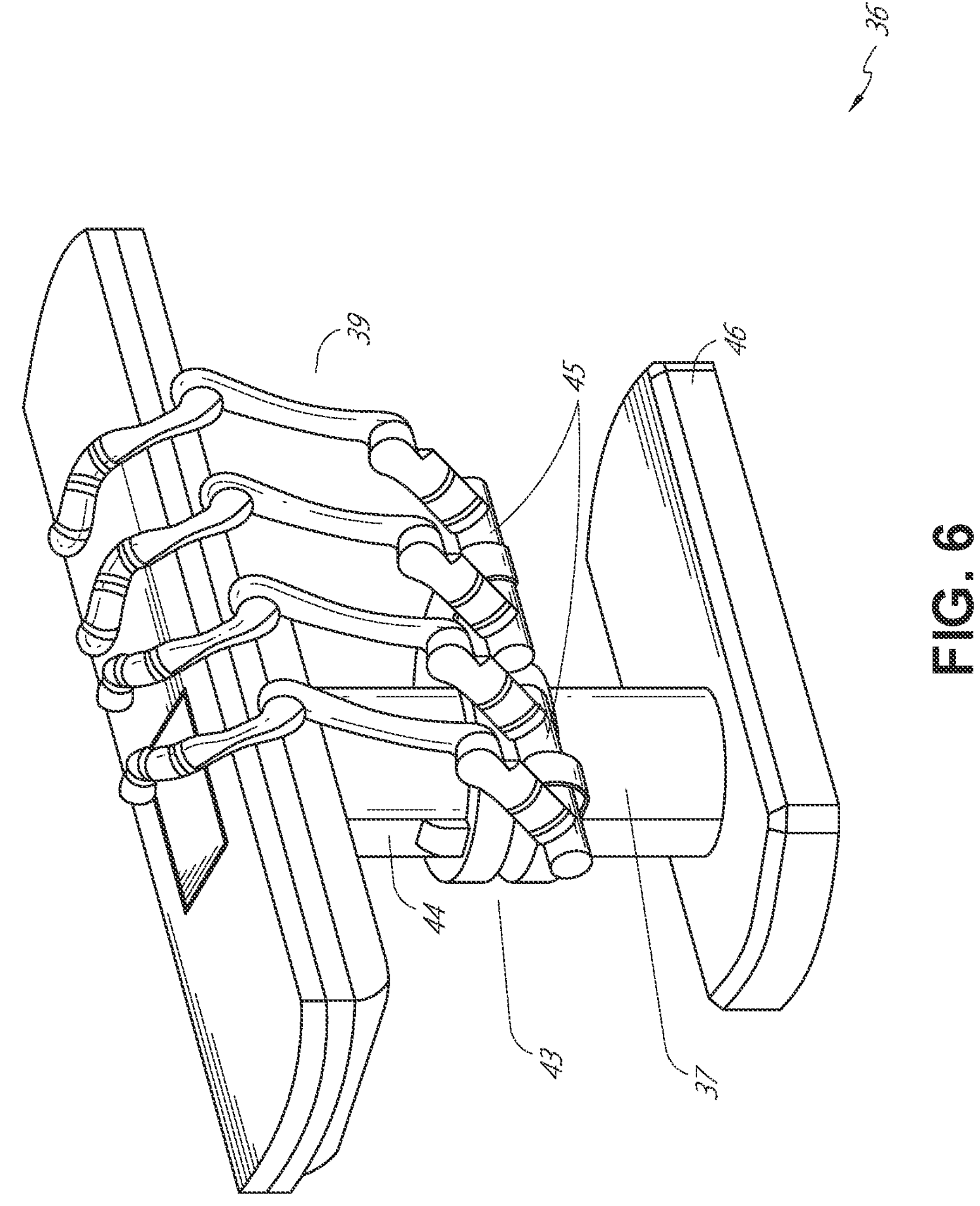
FIG. 6 provides an alternative view of the robotic system of FIG. 5.

FIG. 6 provides an alternative view of the system 36 without the patient and medical instrument for discussion purposes. As shown, the column 37 may include one or more carriages 43 shown as ring-shaped in the system 36, from which the one or more robotic arms 39 may be based. The carriages 43 may translate along a vertical column interface 44 that runs the length of the column 37 to provide different vantage points from which the robotic arms 39 may be positioned to reach the patient. The carriage(s) 43 may rotate around the column 37 using a mechanical motor positioned within the column 37 to allow the robotic arms 39 to have access to multiples sides of the table 38, such as, for example, both sides of the patient. In embodiments with multiple carriages, the carriages may be individually positioned on the column and may translate and/or rotate independent of the other carriages. While carriages 43 need not surround the column 37 or even be circular, the ring-shape as shown facilitates rotation of the carriages 43 around the column 37 while maintaining structural balance. Rotation and translation of the carriages 43 allows the system to align the medical instruments, such as endoscopes and laparoscopes, into different access points on the patient. In other embodiments (not shown), the system 36 can include a patient table or bed with adjustable arm supports in the form of bars or rails extending alongside it. One or more robotic arms 39 (e.g., via a shoulder with an elbow joint) can be attached to the adjustable arm supports, which can be vertically adjusted. By providing vertical adjustment, the robotic arms 39 are advantageously capable of being stowed compactly beneath the patient table or bed, and subsequently raised during a procedure.

Figure 9:
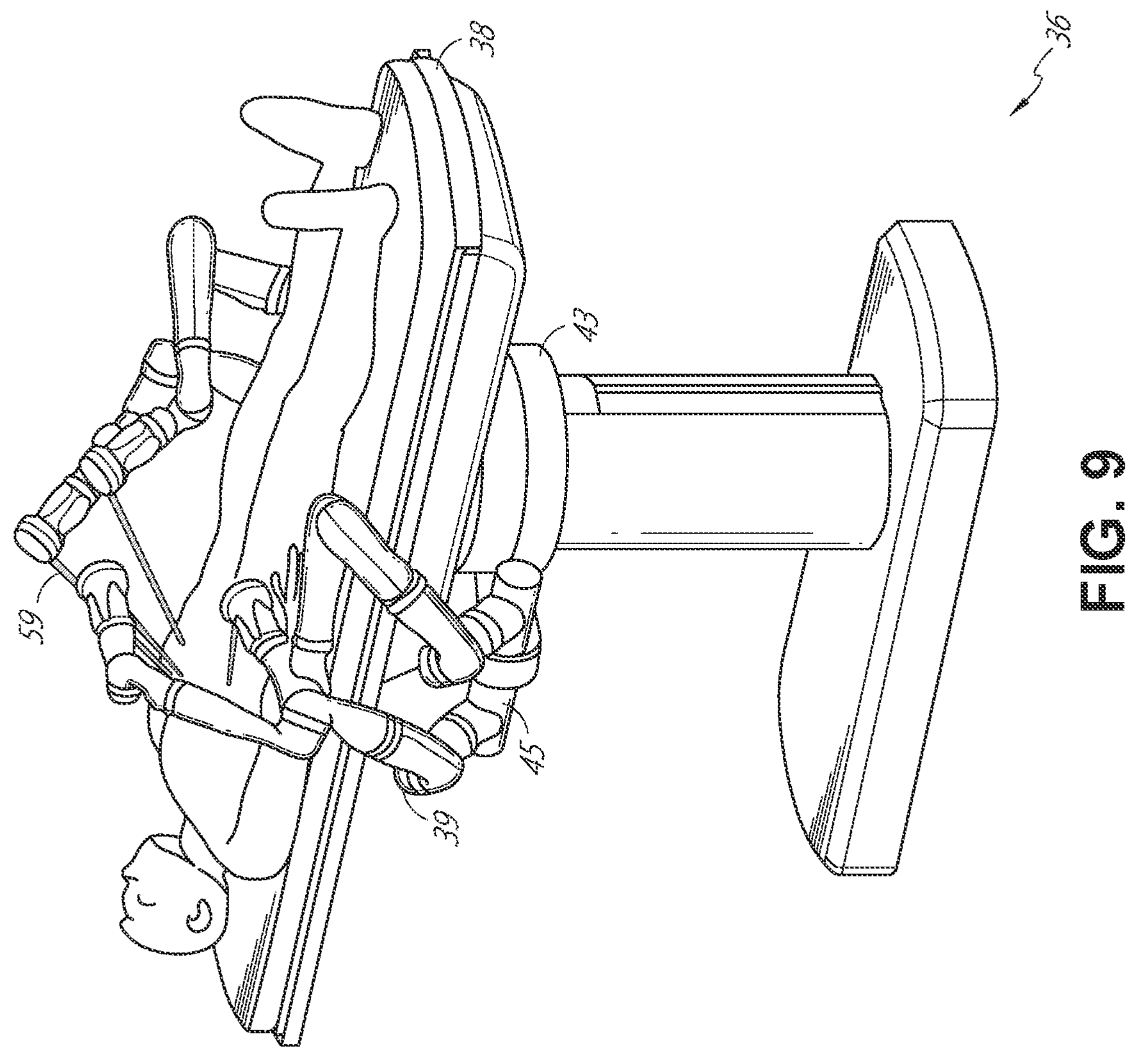
FIG. 9 illustrates an embodiment of a table-based robotic system configured for a laparoscopic procedure.

The arms 39 may be mounted on the carriages through a set of arm mounts 45 comprising a series of joints that may individually rotate and/or telescopically extend to provide additional configurability to the robotic arms 39. Additionally, the arm mounts 45 may be positioned on the carriages 43 such that, when the carriages 43 are appropriately rotated, the arm mounts 45 may be positioned on either the same side of table 38 (as shown in FIG. 6), on opposite sides of table 38 (as shown in FIG. 9), or on adjacent sides of the table 38 (not shown).

The column 37 structurally provides support for the table 38, and a path for vertical translation of the carriages. Internally, the column 37 may be equipped with lead screws for guiding vertical translation of the carriages, and motors to mechanize the translation of said carriages based the lead screws. The column 37 may also convey power and control signals to the carriage 43 and robotic arms 39 mounted thereon.

The table base 46 serves a similar function as the cart base 15 in cart 11 shown in FIG. 2, housing heavier components to balance the table/bed 38, the column 37, the carriages 43, and the robotic arms 39. The table base 46 may also incorporate rigid casters to provide stability during procedures. Deployed from the bottom of the table base 46, the casters may extend in opposite directions on both sides of the base 46 and retract when the system 36 needs to be moved.

Continuing with FIG. 6, the system 36 may also include a tower (not shown) that divides the functionality of system 36 between table and tower to reduce the form factor and bulk of the table. As in earlier disclosed embodiments, the tower may provide a variety of support functionalities to table, such as processing, computing, and control capabilities, power, fluidics, and/or optical and sensor processing. The tower may also be movable to be positioned away from the patient to improve physician access and de-clutter the operating room. Additionally, placing components in the tower allows for more storage space in the table base for potential stowage of the robotic arms. The tower may also include a master controller or console that provides both a user interface for user input, such as keyboard and/or pendant, as well as a display screen (or touchscreen) for pre-operative and intra-operative information, such as real-time imaging, navigation, and tracking information. In some embodiments, the tower may also contain holders for gas tanks to be used for insufflation.

Figure 7:
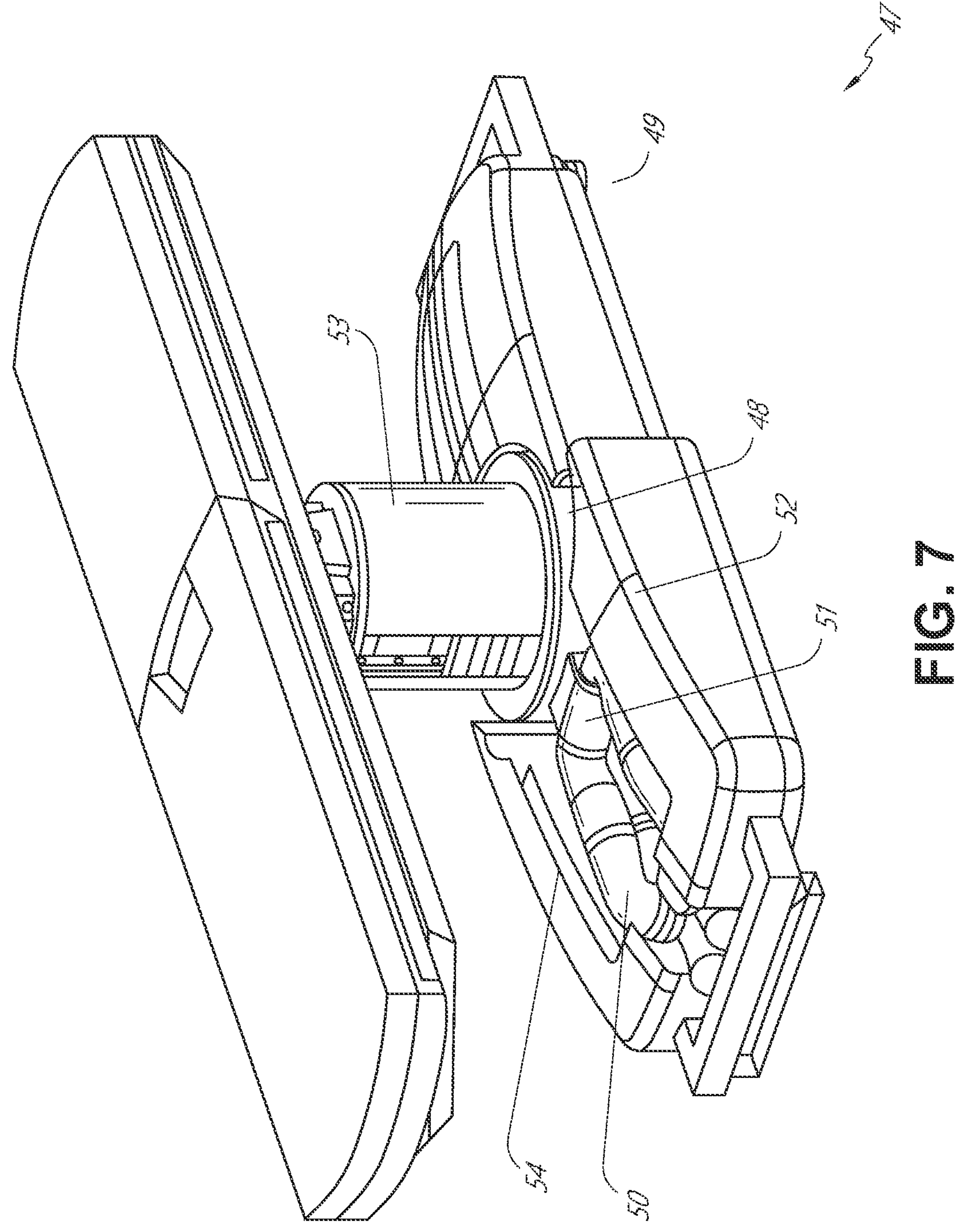
FIG. 7 illustrates an example system configured to stow robotic arm(s).

In some embodiments, a table base may stow and store the robotic arms when not in use. FIG. 7 illustrates a system 47 that stows robotic arms in an embodiment of the table-based system. In system 47, carriages 48 may be vertically translated into base 49 to stow robotic arms 50, arm mounts 51, and the carriages 48 within the base 49. Base covers 52 may be translated and retracted open to deploy the carriages 48, arm mounts 51, and arms 50 around column 53, and closed to stow to protect them when not in use. The base covers 52 may be sealed with a membrane 54 along the edges of its opening to prevent dirt and fluid ingress when closed.

Figure 8:
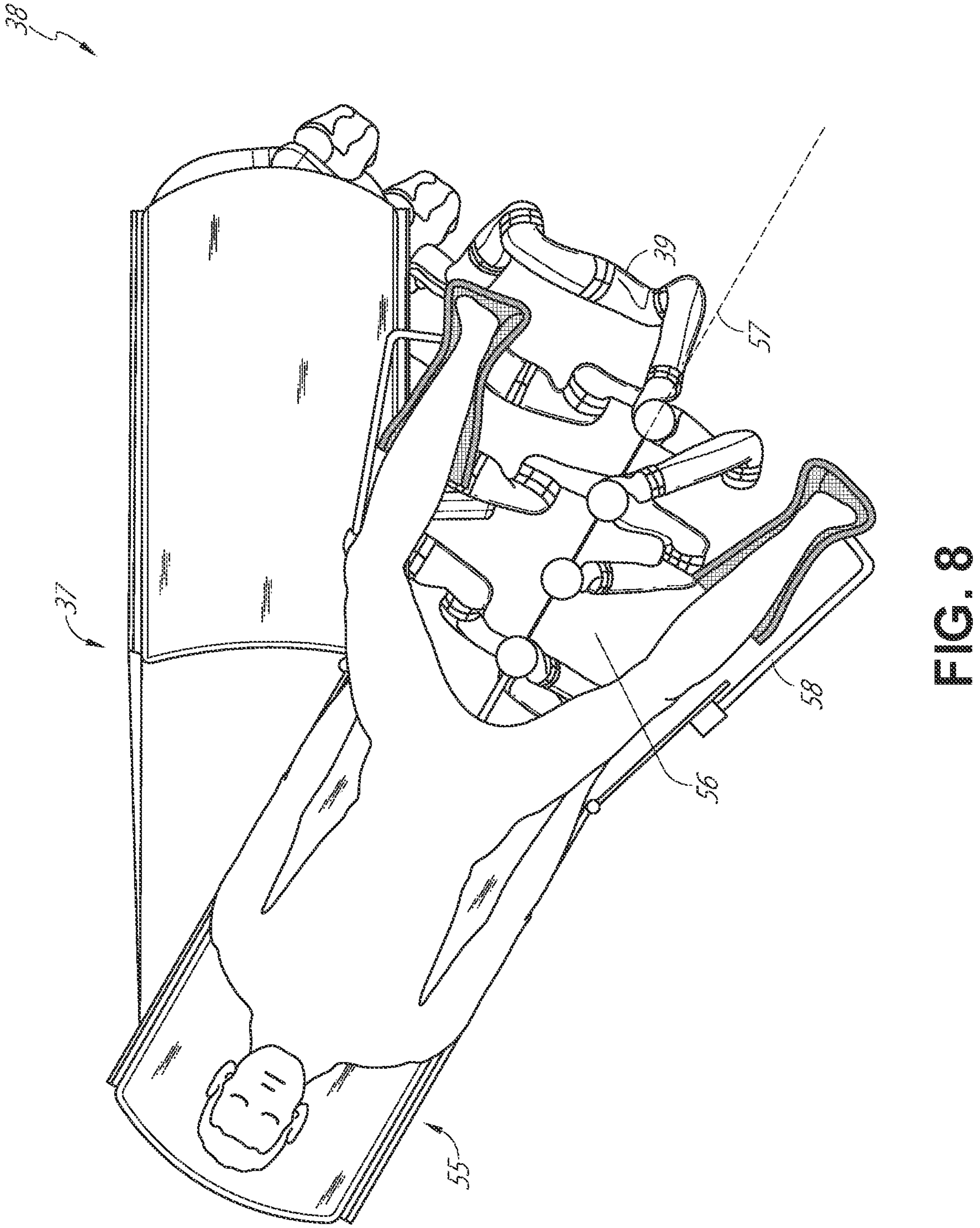
FIG. 8 illustrates an embodiment of a table-based robotic system configured for a ureteroscopy procedure.

FIG. 8 illustrates an embodiment of a robotically enabled table-based system configured for a ureteroscopy procedure. In a ureteroscopy, the table 38 may include a swivel portion 55 for positioning a patient off-angle from the column 37 and table base 46. The swivel portion 55 may rotate or pivot around a pivot point (e.g., located below the patient's head) in order to position the bottom portion of the swivel portion 55 away from the column 37. For example, the pivoting of the swivel portion 55 allows a C-arm (not shown) to be positioned over the patient's lower abdomen without competing for space with the column (not shown) below table 38. By rotating the carriage 35 (not shown) around the column 37, the robotic arms 39 may directly insert a ureteroscope 56 along a virtual rail 57 into the patient's groin area to reach the urethra. In a ureteroscopy, stirrups 58 may also be fixed to the swivel portion 55 of the table 38 to support the position of the patient's legs during the procedure and allow clear access to the patient's groin area.

In a laparoscopic procedure, through small incision(s) in the patient's abdominal wall, minimally invasive instruments may be inserted into the patient's anatomy. In some embodiments, the minimally invasive instruments comprise an elongated rigid member, such as a shaft, which is used to access anatomy within the patient. After inflation of the patient's abdominal cavity, the instruments may be directed to perform surgical or medical tasks, such as grasping, cutting, ablating, suturing, etc. In some embodiments, the instruments can comprise a scope, such as a laparoscope. FIG. 9 illustrates an embodiment of a robotically enabled table-based system configured for a laparoscopic procedure. As shown in FIG. 9, the carriages 43 of the system 36 may be rotated and vertically adjusted to position pairs of the robotic arms 39 on opposite sides of the table 38, such that instrument 59 may be positioned using the arm mounts 45 to be passed through minimal incisions on both sides of the patient to reach his/her abdominal cavity.

Figure 10:
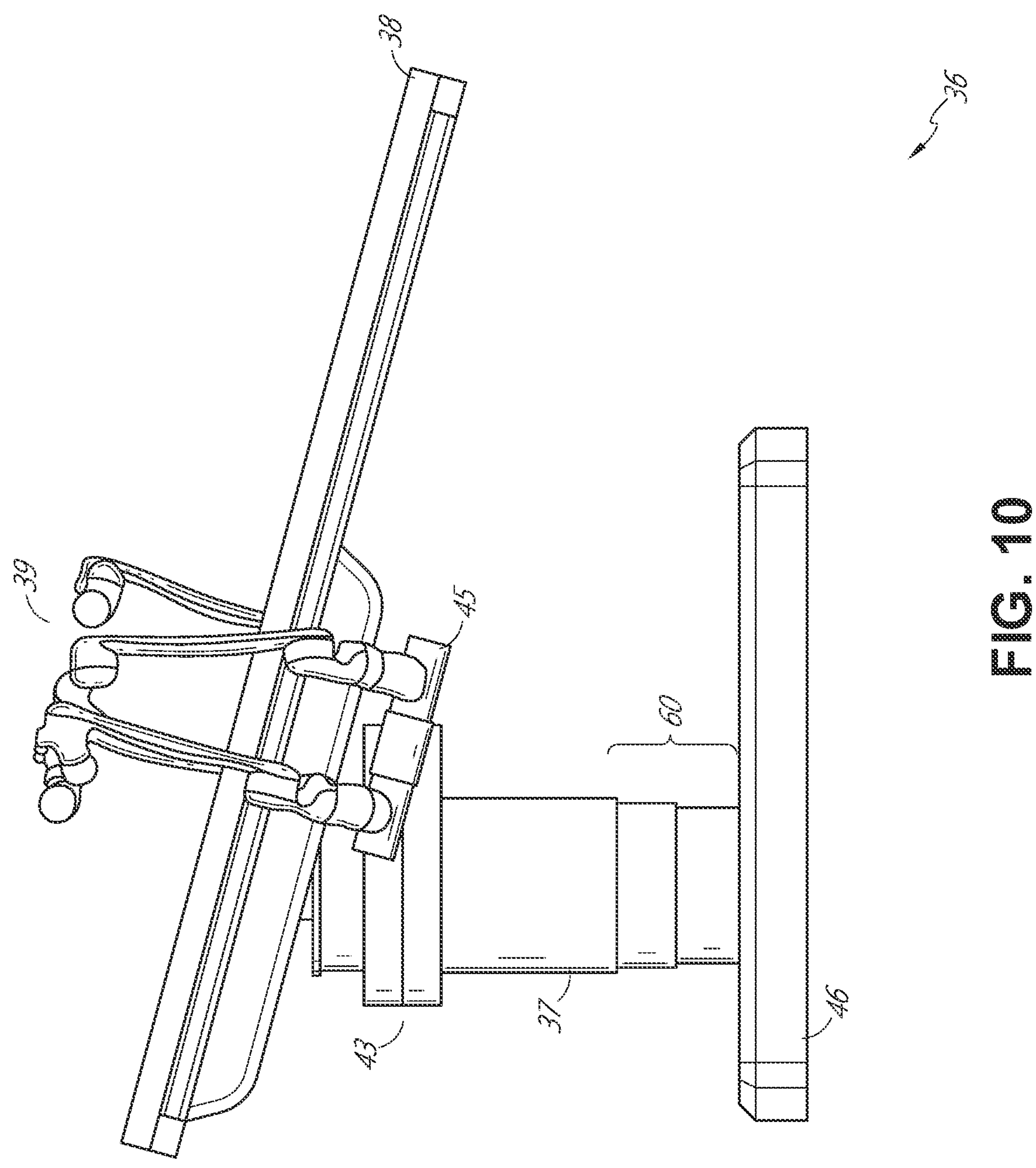
FIG. 10 illustrates an embodiment of the table-based robotic system of FIGS. 5-9 with pitch or tilt adjustment.

To accommodate laparoscopic procedures, the robotically enabled table system may also tilt the platform to a desired angle. FIG. 10 illustrates an embodiment of the robotically enabled medical system with pitch or tilt adjustment. As shown in FIG. 10, the system 36 may accommodate tilt of the table 38 to position one portion of the table at a greater distance from the floor than the other. Additionally, the arm mounts 45 may rotate to match the tilt such that the arms 39 maintain the same planar relationship with table 38. To accommodate steeper angles, the column 37 may also include telescoping portions 60 that allow vertical extension of column 37 to keep the table 38 from touching the floor or colliding with base 46.

Figure 11:
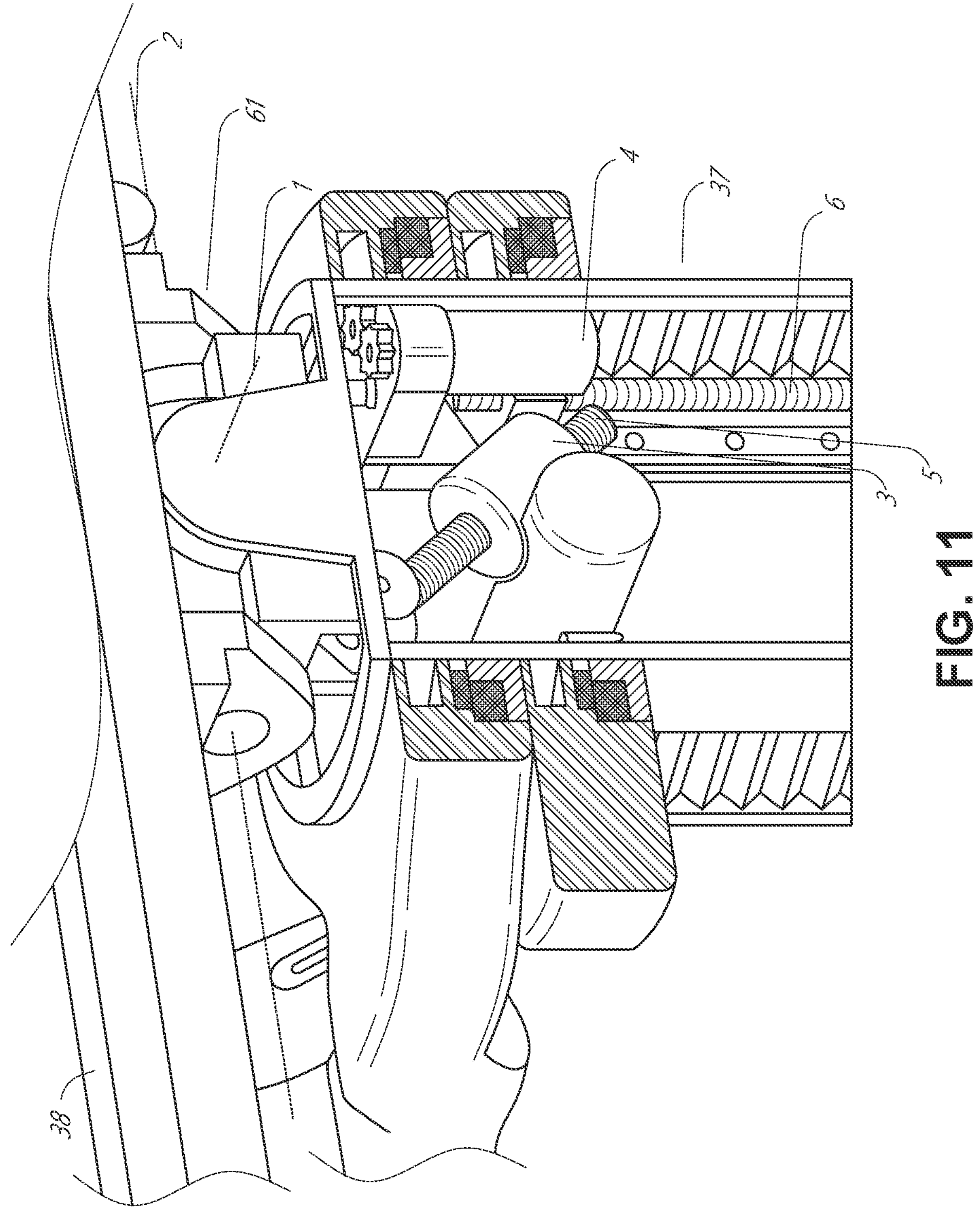
FIG. 11 provides a detailed illustration of the interface between the table and the column of the table-based robotic system of FIGS. 5-10.

FIG. 11 provides a detailed illustration of the interface between the table 38 and the column 37. Pitch rotation mechanism 61 may be configured to alter the pitch angle of the table 38 relative to the column 37 in multiple degrees of freedom. The pitch rotation mechanism 61 may be enabled by the positioning of orthogonal axes 1, 2 at the column-table interface, each axis actuated by a separate motor 3, 4 responsive to an electrical pitch angle command. Rotation along one screw 5 would enable tilt adjustments in one axis 1, while rotation along the other screw 6 would enable tilt adjustments along the other axis 2. In some embodiments, a ball joint can be used to alter the pitch angle of the table 38 relative to the column 37 in multiple degrees of freedom.

For example, pitch adjustments are particularly useful when trying to position the table in a Trendelenburg position, i.e., position the patient's lower abdomen at a higher position from the floor than the patient's upper abdomen, for lower abdominal surgery. The Trendelenburg position causes the patient's internal organs to slide towards his/her upper abdomen through the force of gravity, clearing out the abdominal cavity for minimally invasive tools to enter and perform lower abdominal surgical or medical procedures, such as laparoscopic prostatectomy.

Figure 12:
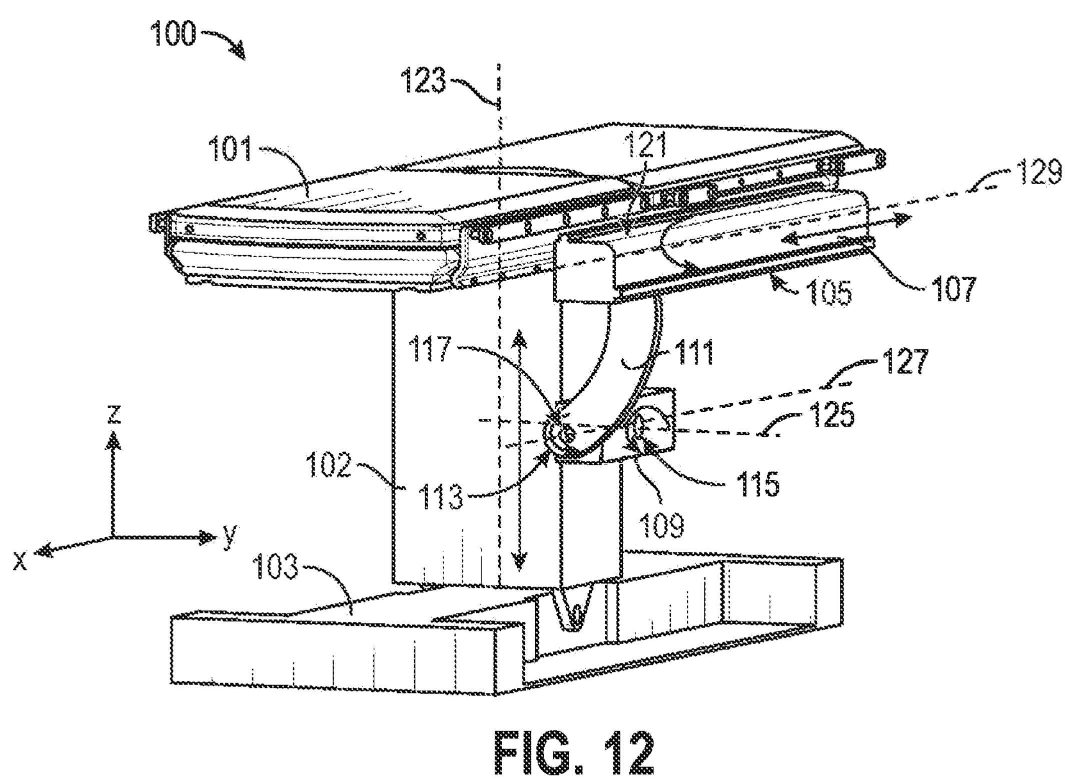
FIG. 12 illustrates an alternative embodiment of a table-based robotic system.
Figure 13:
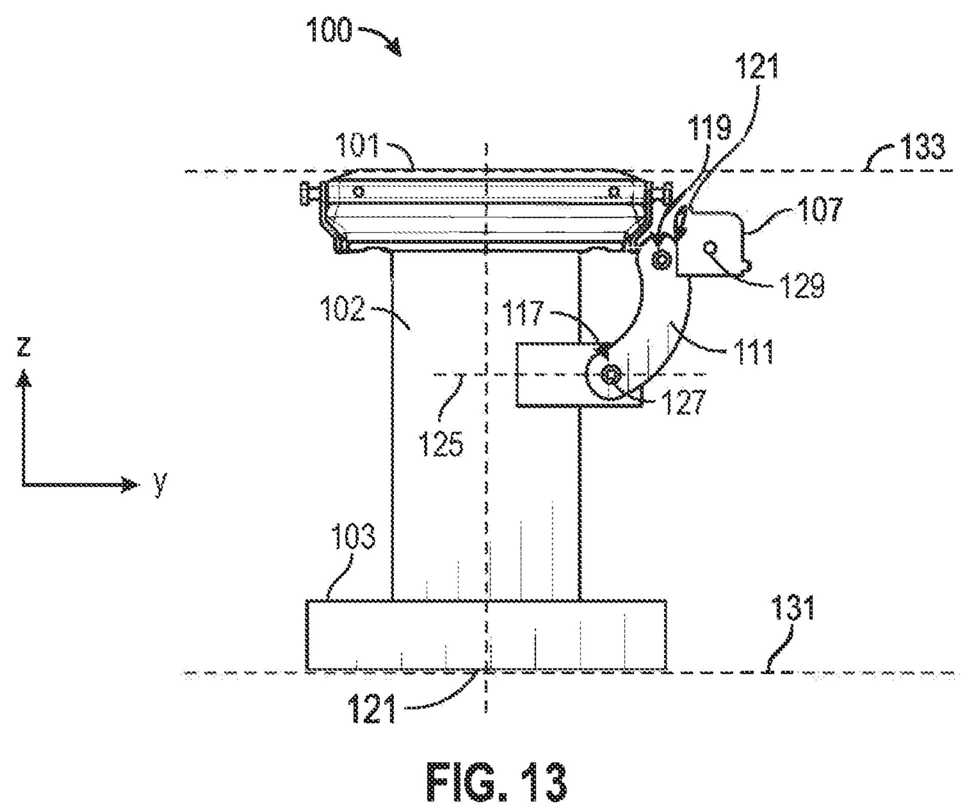
FIG. 13 illustrates an end view of the table-based robotic system of FIG. 12.

FIGS. 12 and 13 illustrate isometric and end views of an alternative embodiment of a table-based surgical robotics system 100. The surgical robotics system 100 includes one or more adjustable arm supports 105 that can be configured to support one or more robotic arms (see, for example, FIG. 14) relative to a table 101. In the illustrated embodiment, a single adjustable arm support 105 is shown, though an additional arm support can be provided on an opposite side of the table 101. The adjustable arm support 105 can be configured so that it can move relative to the table 101 to adjust and/or vary the position of the adjustable arm support 105 and/or any robotic arms mounted thereto relative to the table 101. For example, the adjustable arm support 105 may be adjusted one or more degrees of freedom relative to the table 101. The adjustable arm support 105 provides high versatility to the system 100, including the ability to easily stow the one or more adjustable arm supports 105 and any robotics arms attached thereto beneath the table 101. The adjustable arm support 105 can be elevated from the stowed position to a position below an upper surface of the table 101. In other embodiments, the adjustable arm support 105 can be elevated from the stowed position to a position above an upper surface of the table 101.

The adjustable arm support 105 can provide several degrees of freedom, including lift, lateral translation, tilt, etc. In the illustrated embodiment of FIGS. 12 and 13, the arm support 105 is configured with four degrees of freedom, which are illustrated with arrows in FIG. 12. A first degree of freedom allows for adjustment of the adjustable arm support 105 in the z-direction ("Z-lift"). For example, the adjustable arm support 105 can include a carriage 109 configured to move up or down along or relative to a column 102 supporting the table 101. A second degree of freedom can allow the adjustable arm support 105 to tilt. For example, the adjustable arm support 105 can include a rotary joint, which can allow the adjustable arm support 105 to be aligned with the bed in a Trendelenburg position. A third degree of freedom can allow the adjustable arm support 105 to "pivot up," which can be used to adjust a distance between a side of the table 101 and the adjustable arm support 105. A fourth degree of freedom can permit translation of the adjustable arm support 105 along a longitudinal length of the table.

The surgical robotics system 100 in FIGS. 12 and 13 can comprise a table supported by a column 102 that is mounted to a base 103. The base 103 and the column 102 support the table 101 relative to a support surface. A floor axis 131 and a support axis 133 are shown in FIG. 13.

The adjustable arm support 105 can be mounted to the column 102. In other embodiments, the arm support 105 can be mounted to the table 101 or base 103. The adjustable arm support 105 can include a carriage 109, a bar or rail connector 111 and a bar or rail 107. In some embodiments, one or more robotic arms mounted to the rail 107 can translate and move relative to one another.

The carriage 109 can be attached to the column 102 by a first joint 113, which allows the carriage 109 to move relative to the column 102 (e.g., such as up and down a first or vertical axis 123). The first joint 113 can provide the first degree of freedom ("Z-lift") to the adjustable arm support 105. The adjustable arm support 105 can include a second joint 115, which provides the second degree of freedom (tilt) for the adjustable arm support 105. The adjustable arm support 105 can include a third joint 117, which can provide the third degree of freedom ("pivot up") for the adjustable arm support 105. An additional joint 119 (shown in FIG. 13) can be provided that mechanically constrains the third joint 117 to maintain an orientation of the rail 107 as the rail connector 111 is rotated about a third axis 127. The adjustable arm support 105 can include a fourth joint 121, which can provide a fourth degree of freedom (translation) for the adjustable arm support 105 along a fourth axis 129.

Figure 14:
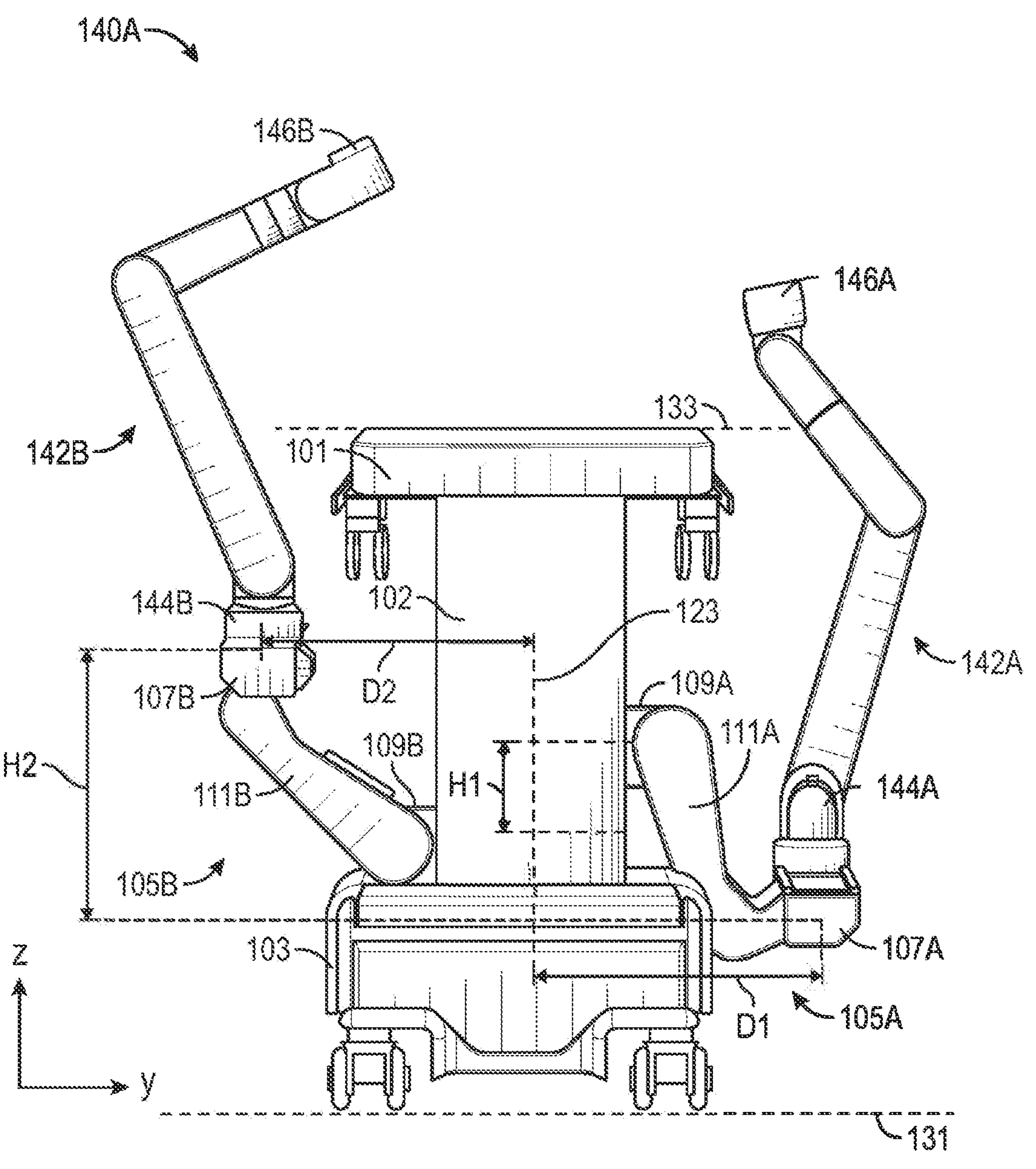
FIG. 14 illustrates an end view of a table-based robotic system with robotic arms attached thereto.

FIG. 14 illustrates an end view of the surgical robotics system 140A with two adjustable arm supports 105A, 105B mounted on opposite sides of a table 101. A first robotic arm 142A is attached to the bar or rail 107A of the first adjustable arm support 105B. The first robotic arm 142A includes a base 144A attached to the rail 107A. The distal end of the first robotic arm 142A includes an instrument drive mechanism 146A that can attach to one or more robotic medical instruments or tools. Similarly, the second robotic arm 142B includes a base 144B attached to the rail 107B. The distal end of the second robotic arm 142B includes an instrument drive mechanism 146B. The instrument drive mechanism 146B can be configured to attach to one or more robotic medical instruments or tools.

In some embodiments, one or more of the robotic arms 142A, 142B comprises an arm with seven or more degrees of freedom. In some embodiments, one or more of the robotic arms 142A, 142B can include eight degrees of freedom, including an insertion axis (one degree of freedom, including insertion), a wrist (three degrees of freedom, including wrist pitch, yaw, and roll), an elbow (one degree of freedom, including elbow pitch), a shoulder (two degrees of freedom, including shoulder pitch and yaw), and base 144A, 144B (one degree of freedom, including translation). In some embodiments, the insertion degree of freedom can be provided by the robotic arm 142A, 142B, while in other embodiments, the instrument itself provides insertion via an instrument-based insertion architecture.

C. Instrument Driver & Interface

The end effectors of the system's robotic arms comprise (i) an instrument driver (alternatively referred to as "instrument drive mechanism" or "instrument device manipulator") that incorporate electro-mechanical means for actuating the medical instrument and (ii) a removable or detachable medical instrument, which may be devoid of any electro-mechanical components, such as motors. This dichotomy may be driven by the need to sterilize medical instruments used in medical procedures, and the inability to adequately sterilize expensive capital equipment due to their intricate mechanical assemblies and sensitive electronics. Accordingly, the medical instruments may be designed to be detached, removed, and interchanged from the instrument driver (and thus the system) for individual sterilization or disposal by the physician or the physician's staff. In contrast, the instrument drivers need not be changed or sterilized, and may be draped for protection.

Figure 15:
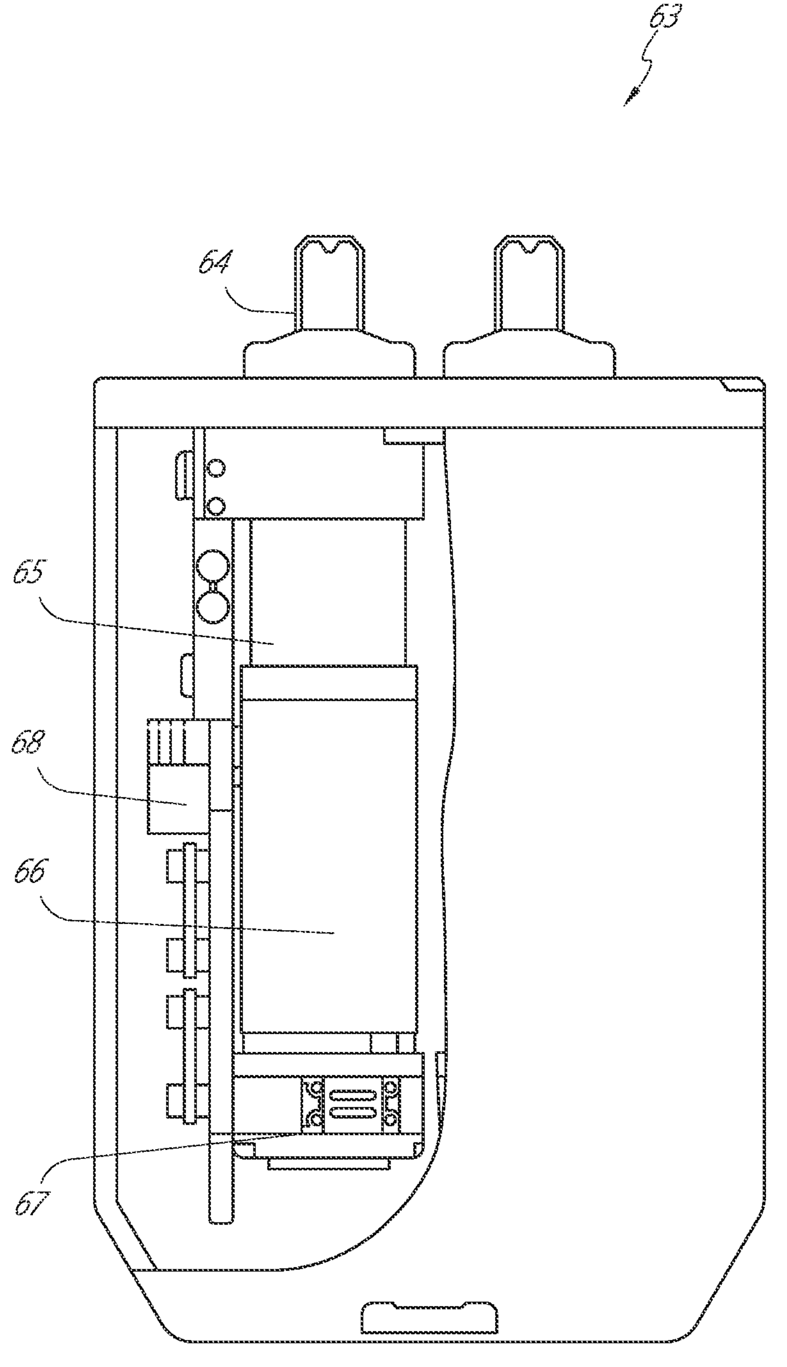
FIG. 15 illustrates an exemplary instrument driver.
Figure 15:

FIG. 15 illustrates an example instrument driver. Positioned at the distal end of a robotic arm, instrument driver 62 comprises of one or more drive units 63 arranged with parallel axes to provide controlled torque to a medical instrument via drive shafts 64. Each drive unit 63 comprises an individual drive shaft 64 for interacting with the instrument, a gear head 65 for converting the motor shaft rotation to a desired torque, a motor 66 for generating the drive torque, an encoder 67 to measure the speed of the motor shaft and provide feedback to the control circuitry, and control circuitry 68 for receiving control signals and actuating the drive unit. Each drive unit 63 being independently controlled and motorized, the instrument driver 62 may provide multiple (four as shown in FIG. 15) independent drive outputs to the medical instrument. In operation, the control circuitry 68 would receive a control signal, transmit a motor signal to the motor 66, compare the resulting motor speed as measured by the encoder 67 with the desired speed, and modulate the motor signal to generate the desired shape.

For procedures that require a sterile environment, the robotic system may incorporate a drive interface, such as a sterile adapter connected to a sterile drape, that sits between the instrument driver and the medical instrument. The chief purpose of the sterile adapter is to transfer angular motion from the drive shafts of the instrument driver to the drive inputs of the instrument while maintaining physical separation, and thus sterility, between the drive shafts and drive inputs. Accordingly, an example sterile adapter may comprise of a series of rotational inputs and outputs intended to be mated with the drive shafts of the instrument driver and drive inputs on the instrument. Connected to the sterile adapter, the sterile drape, comprised of a thin, flexible material such as transparent or translucent plastic, is designed to cover the capital equipment, such as the instrument driver, robotic arm, and cart (in a cart-based system) or table (in a table-based system). Use of the drape would allow the capital equipment to be positioned proximate to the patient while still being located in an area not requiring sterilization (i.e., non-sterile field). On the other side of the sterile drape, the medical instrument may interface with the patient in an area requiring sterilization (i.e., sterile field).

D. Medical Instrument

Figure 16:
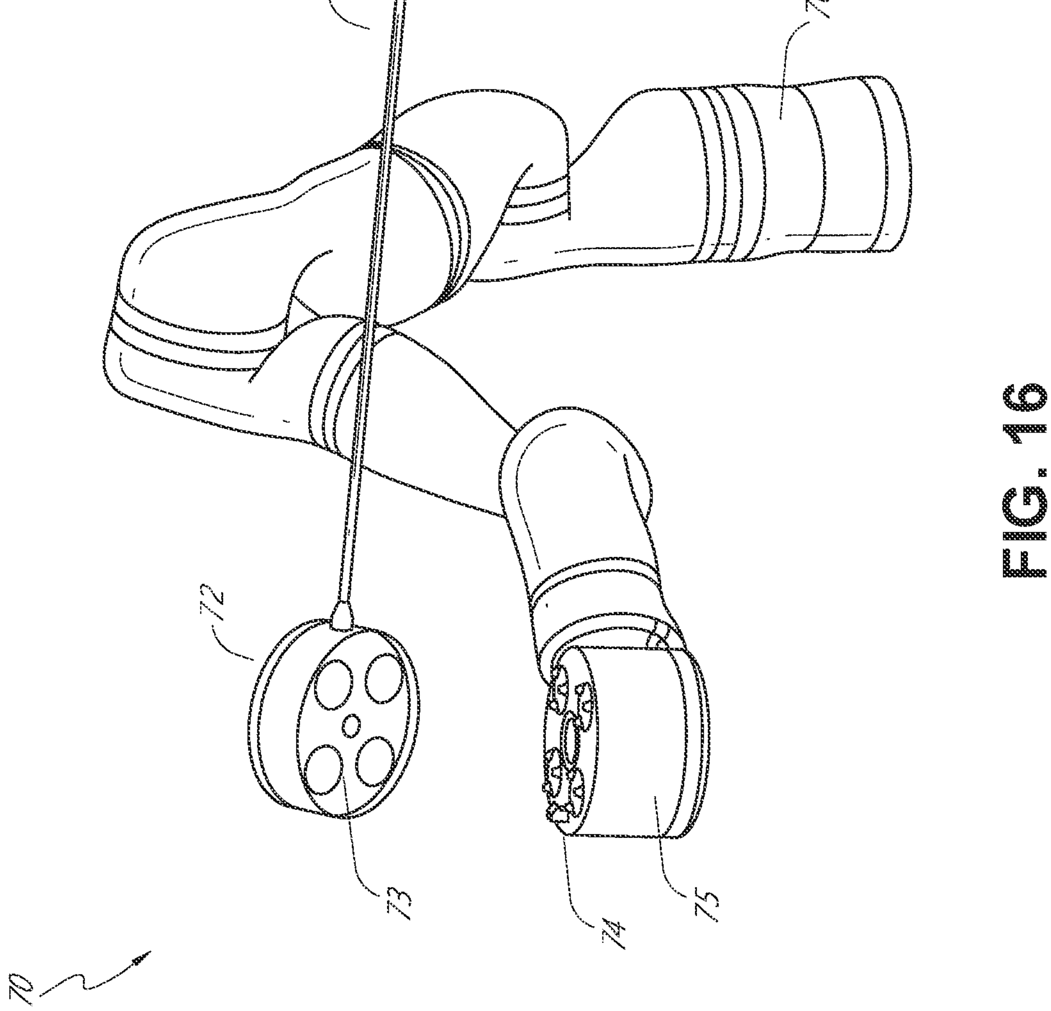
FIG. 16 illustrates an exemplary medical instrument with a paired instrument driver.

FIG. 16 illustrates an example medical instrument with a paired instrument driver. Like other instruments designed for use with a robotic system, medical instrument 70 comprises an elongated shaft 71 (or elongate body) and an instrument base 72. The instrument base 72, also referred to as an "instrument handle" due to its intended design for manual interaction by the physician, may generally comprise rotatable drive inputs 73, e.g., receptacles, pulleys or spools, that are designed to be mated with drive outputs 74 that extend through a drive interface on instrument driver 75 at the distal end of robotic arm 76. When physically connected, latched, and/or coupled, the mated drive inputs 73 of instrument base 72 may share axes of rotation with the drive outputs 74 in the instrument driver 75 to allow the transfer of torque from drive outputs 74 to drive inputs 73. In some embodiments, the drive outputs 74 may comprise splines that are designed to mate with receptacles on the drive inputs 73.

The elongated shaft 71 is designed to be delivered through either an anatomical opening or lumen, e.g., as in endoscopy, or a minimally invasive incision, e.g., as in laparoscopy. The elongated shaft 71 may be either flexible (e.g., having properties similar to an endoscope) or rigid (e.g., having properties similar to a laparoscope) or contain a customized combination of both flexible and rigid portions. When designed for laparoscopy, the distal end of a rigid elongated shaft may be connected to an end effector extending from a jointed wrist formed from a clevis with at least one degree of freedom and a surgical tool or medical instrument, such as, for example, a grasper or scissors, that may be actuated based on force from the tendons as the drive inputs rotate in response to torque received from the drive outputs 74 of the instrument driver 75. When designed for endoscopy, the distal end of a flexible elongated shaft may include a steerable or controllable bending section that may be articulated and bent based on torque received from the drive outputs 74 of the instrument driver 75.

Torque from the instrument driver 75 is transmitted down the elongated shaft 71 using tendons along the shaft 71. These individual tendons, such as pull wires, may be individually anchored to individual drive inputs 73 within the instrument handle 72. From the handle 72, the tendons are directed down one or more pull lumens along the elongated shaft 71 and anchored at the distal portion of the elongated shaft 71, or in the wrist at the distal portion of the elongated shaft. During a surgical procedure, such as a laparoscopic, endoscopic or hybrid procedure, these tendons may be coupled to a distally mounted end effector, such as a wrist, grasper, or scissor. Under such an arrangement, torque exerted on drive inputs 73 would transfer tension to the tendon, thereby causing the end effector to actuate in some way. In some embodiments, during a surgical procedure, the tendon may cause a joint to rotate about an axis, thereby causing the end effector to move in one direction or another. Alternatively, the tendon may be connected to one or more jaws of a grasper at distal end of the elongated shaft 71, where tension from the tendon cause the grasper to close.

In endoscopy, the tendons may be coupled to a bending or articulating section positioned along the elongated shaft 71 (e.g., at the distal end) via adhesive, control ring, or other mechanical fixation. When the tendons are fixedly attached to the distal end of a bending section, torque exerted on drive inputs 73 would be transmitted down the tendons, causing the softer, bending section (sometimes referred to as the articulable section or region) to bend or articulate. Along the non-bending sections, it may be advantageous to spiral or helix the individual pull lumens that direct the individual tendons along (or inside) the walls of the endoscope shaft to balance the radial forces that result from tension in the pull wires. The angle of the spiraling and/or spacing there between may be altered or engineered for specific purposes, wherein tighter spiraling exhibits lesser shaft compression under load forces, while lower amounts of spiraling results in greater shaft compression under load forces, but also limits bending. On the other end of the spectrum, the pull lumens may be directed parallel to the longitudinal axis of the elongated shaft 71 to allow for controlled articulation in the desired bending or articulable sections.

In endoscopy, the elongated shaft 71 houses a number of components to assist with the robotic procedure. The shaft may comprise of a working channel for deploying surgical tools (or medical instruments), irrigation, and/or aspiration to the operative region at the distal end of the shaft 71. The shaft 71 may also accommodate wires and/or optical fibers to transfer signals to/from an optical assembly at the distal tip, which may include of an optical camera. The shaft 71 may also accommodate optical fibers to carry light from proximally located light sources, such as light emitting diodes, to the distal end of the shaft.

At the distal end of the instrument 70, the distal tip may also comprise the opening of a working channel for delivering tools for diagnostic and/or therapy, irrigation, and aspiration to an operative site. The distal tip may also include a port for a camera, such as a fiberscope or a digital camera, to capture images of an internal anatomical space. Relatedly, the distal tip may also include ports for light sources for illuminating the anatomical space when using the camera.

In the example of FIG. 16, the drive shaft axes, and thus the drive input axes, are orthogonal to the axis of the elongated shaft. This arrangement, however, complicates roll capabilities for the elongated shaft 71. Rolling the elongated shaft 71 along its axis while keeping the drive inputs 73 static results in undesirable tangling of the tendons as they extend off the drive inputs 73 and enter pull lumens within the elongated shaft 71. The resulting entanglement of such tendons may disrupt any control algorithms intended to predict movement of the flexible elongated shaft during an endoscopic procedure.

Figure 17:
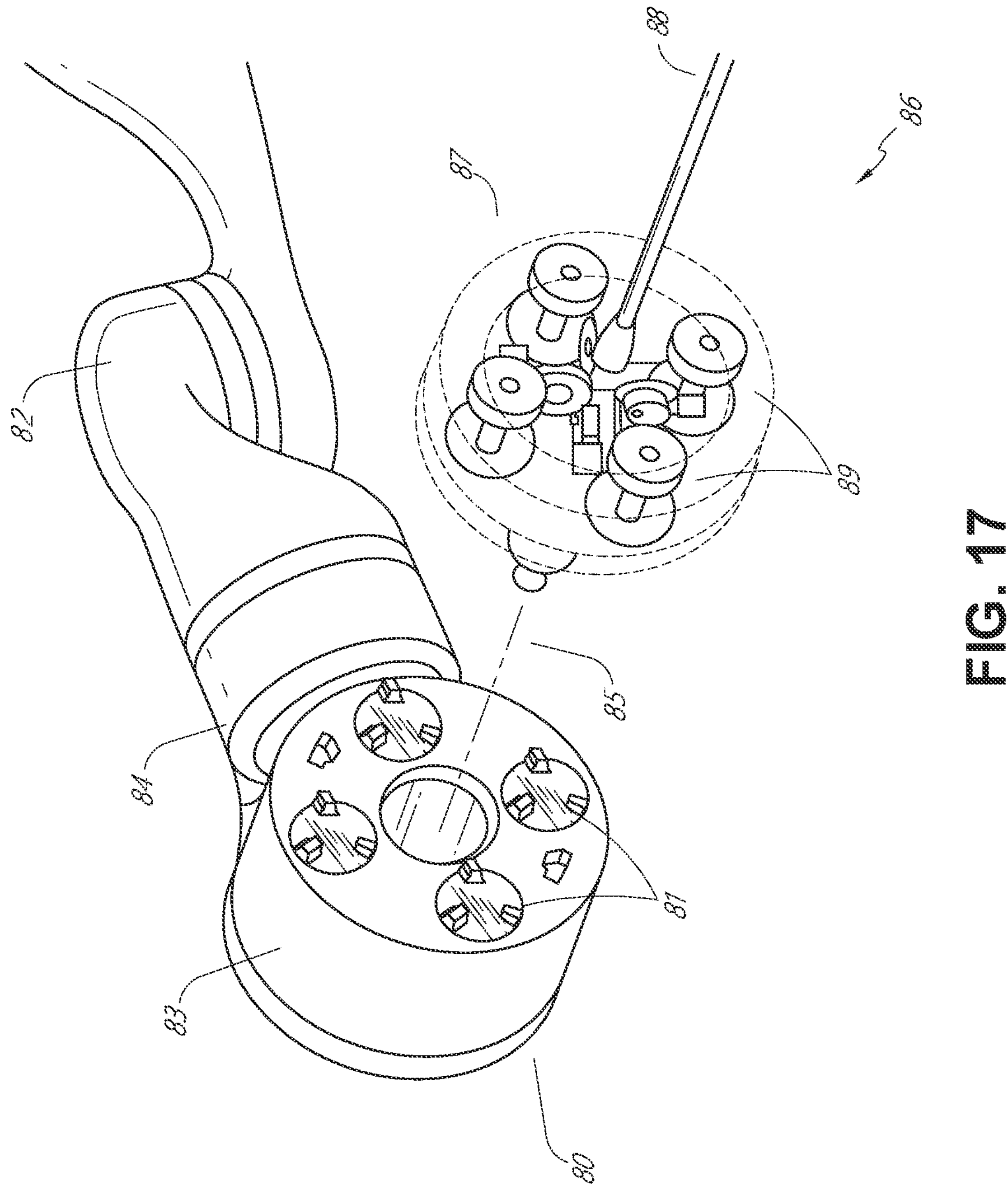
FIG. 17 illustrates an alternative design for an instrument driver and instrument where the axes of the drive units are parallel to the axis of the elongated shaft of the instrument.

FIG. 17 illustrates an alternative design for an instrument driver and instrument where the axes of the drive units are parallel to the axis of the elongated shaft of the instrument. As shown, a circular instrument driver 80 comprises four drive units with their drive outputs 81 aligned in parallel at the end of a robotic arm 82. The drive units, and their respective drive outputs 81, are housed in a rotational assembly 83 of the instrument driver 80 that is driven by one of the drive units within the assembly 83. In response to torque provided by the rotational drive unit, the rotational assembly 83 rotates along a circular bearing that connects the rotational assembly 83 to the non-rotational portion 84 of the instrument driver. Power and controls signals may be communicated from the non-rotational portion 84 of the instrument driver 80 to the rotational assembly 83 through electrical contacts that may be maintained through rotation by the brushed slip ring connection (not shown). In other embodiments, the rotational assembly 83 may be responsive to a separate drive unit that is integrated into the non-rotational portion 84, and thus not in parallel to the other drive units. The rotational mechanism 83 allows the instrument driver 80 to rotate the drive units, and their respective drive outputs 81, as a single unit around an instrument driver axis 85.

Like earlier disclosed embodiments, an instrument 86 may comprise an elongated shaft portion 88 and an instrument base 87 (shown with a transparent external skin for discussion purposes) comprising a plurality of drive inputs 89 (such as receptacles, pulleys, and spools) that are configured to receive the drive outputs 81 in the instrument driver 80. Unlike prior disclosed embodiments, instrument shaft 88 extends from the center of instrument base 87 with an axis substantially parallel to the axes of the drive inputs 89, rather than orthogonal as in the design of FIG. 16.

When coupled to the rotational assembly 83 of the instrument driver 80, the medical instrument 86, comprising instrument base 87 and instrument shaft 88, rotates in combination with the rotational assembly 83 about the instrument driver axis 85. Since the instrument shaft 88 is positioned at the center of instrument base 87, the instrument shaft 88 is coaxial with instrument driver axis 85 when attached. Thus, rotation of the rotational assembly 83 causes the instrument shaft 88 to rotate about its own longitudinal axis. Moreover, as the instrument base 87 rotates with the instrument shaft 88, any tendons connected to the drive inputs 89 in the instrument base 87 are not tangled during rotation. Accordingly, the parallelism of the axes of the drive outputs 81, drive inputs 89, and instrument shaft 88 allows for the shaft rotation without tangling any control tendons.

Figure 18:
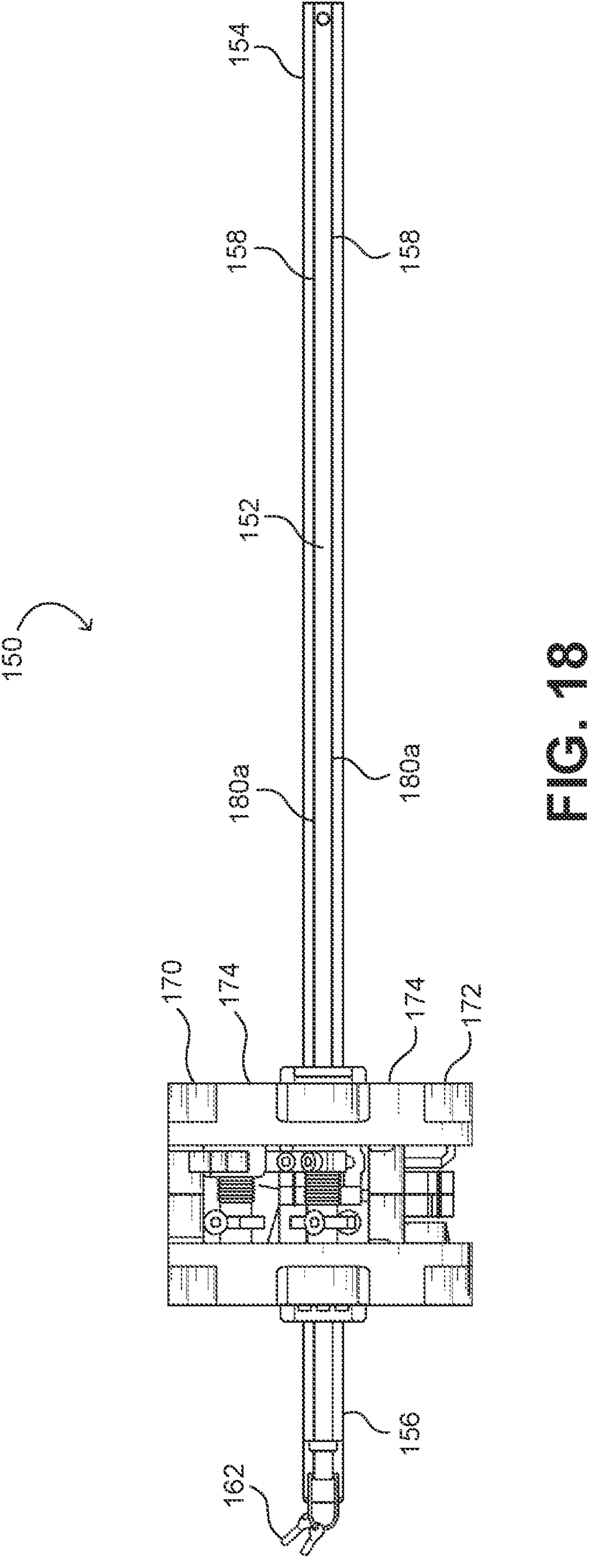
FIG. 18 illustrates an instrument having an instrument-based insertion architecture.

FIG. 18 illustrates an instrument having an instrument based insertion architecture in accordance with some embodiments. The instrument 150 can be coupled to any of the instrument drivers discussed above. The instrument 150 comprises an elongated shaft 152, an end effector 162 connected to the shaft 152, a handle 170 coupled to the shaft 152. The elongated shaft 152 comprises a tubular member having a proximal portion 154 and a distal portion 156. The elongated shaft 152 comprises one or more channels or grooves 158 along its outer surface. The grooves 158 are configured to receive one or more wire cables **180*a* through. One or more cables 180*a* thus run along an outer surface of the elongated shaft 152. In other embodiments, cables 180*a* can also run through the elongated shaft 152. Manipulation of the one or more cables 180*a* (e.g., via an instrument driver) results in actuation of the end effector 162**.

The instrument handle 170, which may also be referred to as an instrument base, may generally comprise an attachment interface 172 having one or more mechanical inputs 174, e.g., receptacles, pulleys or spools, that are designed to be reciprocally mated with one or more torque couplers on an attachment surface of an instrument driver.

In some embodiments, the instrument 150 comprises a series of pulleys or cables that enable the elongated shaft 152 to translate relative to the handle 170. In other words, the instrument 150 itself comprises an instrument-based insertion architecture that accommodates insertion of the instrument, thereby minimizing the reliance on a robot arm to provide insertion of the instrument 150. In other embodiments, a robotic arm can be largely responsible for instrument insertion.

E. Controller

Any of the robotic systems described herein can include an input device or controller for manipulating an instrument attached to a robotic arm. In some embodiments, the controller can be coupled (e.g., communicatively, electronically, electrically, wirelessly and/or mechanically) with an instrument such that manipulation of the controller causes a corresponding manipulation of the instrument e.g., via master slave control.

Figure 19:
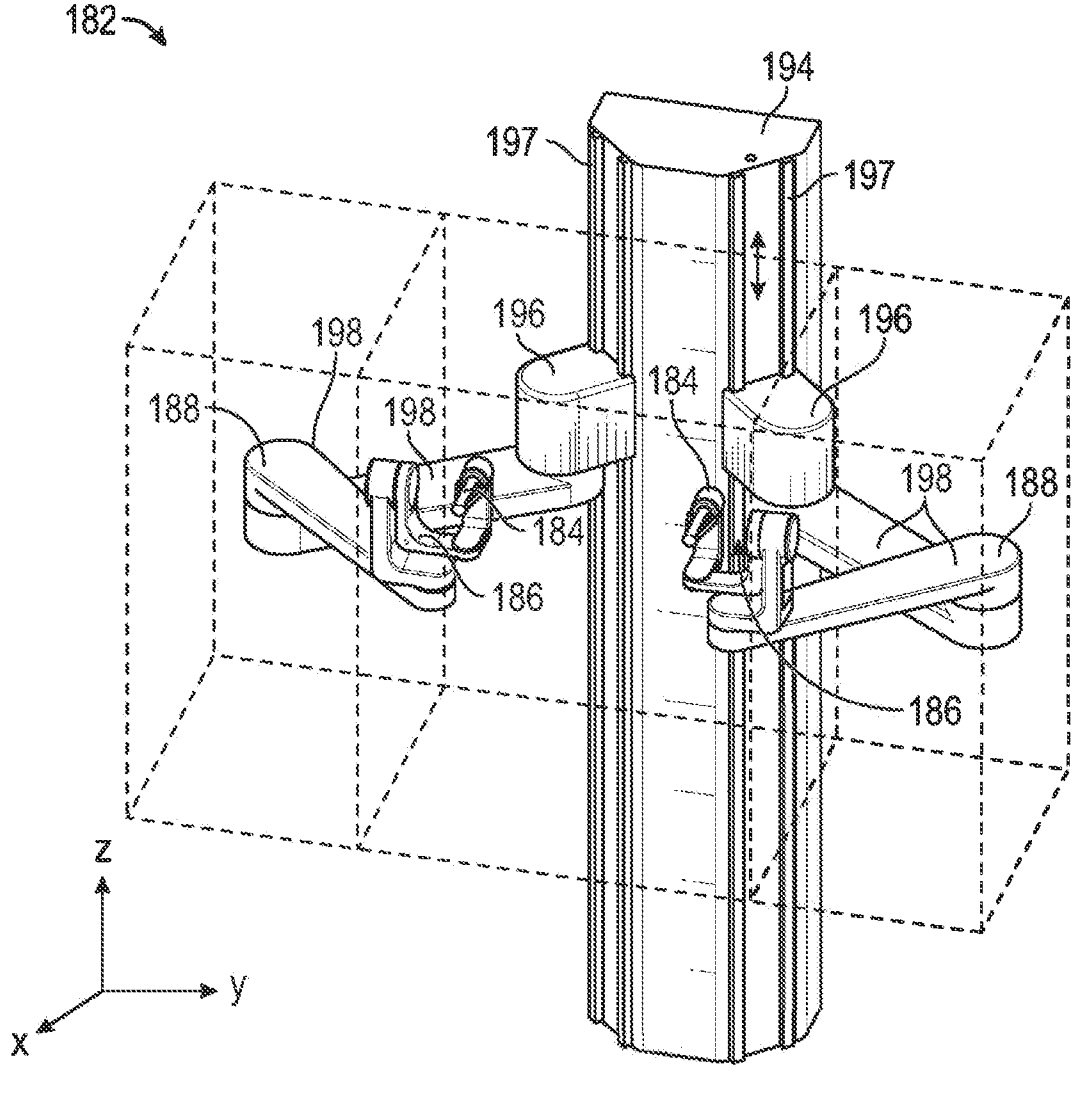
FIG. 19 illustrates an exemplary controller.

FIG. 19 is a perspective view of an embodiment of a controller 182. In the present embodiment, the controller 182 comprises a hybrid controller that can have both impedance and admittance control. In other embodiments, the controller 182 can utilize just impedance or passive control. In other embodiments, the controller 182 can utilize just admittance control. By being a hybrid controller, the controller 182 advantageously can have a lower perceived inertia while in use.

In the illustrated embodiment, the controller 182 is configured to allow manipulation of two medical instruments, and includes two handles 184. Each of the handles 184 is connected to a gimbal 186. Each gimbal 186 is connected to a positioning platform 188.

As shown in FIG. 19, each positioning platform 188 includes a SCARA arm (selective compliance assembly robot arm) 198 coupled to a column 194 by a prismatic joint 196. The prismatic joints 196 are configured to translate along the column 194 (e.g., along rails 197) to allow each of the handles 184 to be translated in the z-direction, providing a first degree of freedom. The SCARA arm 198 is configured to allow motion of the handle 184 in an x-y plane, providing two additional degrees of freedom.

In some embodiments, one or more load cells are positioned in the controller. For example, in some embodiments, a load cell (not shown) is positioned in the body of each of the gimbals 186. By providing a load cell, portions of the controller 182 are capable of operating under admittance control, thereby advantageously reducing the perceived inertia of the controller while in use. In some embodiments, the positioning platform 188 is configured for admittance control, while the gimbal 186 is configured for impedance control. In other embodiments, the gimbal 186 is configured for admittance control, while the positioning platform 188 is configured for impedance control. Accordingly, for some embodiments, the translational or positional degrees of freedom of the positioning platform 188 can rely on admittance control, while the rotational degrees of freedom of the gimbal 186 rely on impedance control.

F. Navigation and Control

Traditional endoscopy may involve the use of fluoroscopy (e.g., as may be delivered through a C-arm) and other forms of radiation-based imaging modalities to provide endoluminal guidance to an operator physician. In contrast, the robotic systems contemplated by this disclosure can provide for non-radiation-based navigational and localization means to reduce physician exposure to radiation and reduce the amount of equipment within the operating room. As used herein, the term "localization" may refer to determining and/or monitoring the position of objects in a reference coordinate system. Technologies such as pre-operative mapping, computer vision, real-time EM tracking, and robot command data may be used individually or in combination to achieve a radiation-free operating environment. In other cases, where radiation-based imaging modalities are still used, the pre-operative mapping, computer vision, real-time EM tracking, and robot command data may be used individually or in combination to improve upon the information obtained solely through radiation-based imaging modalities.

Figure 20:
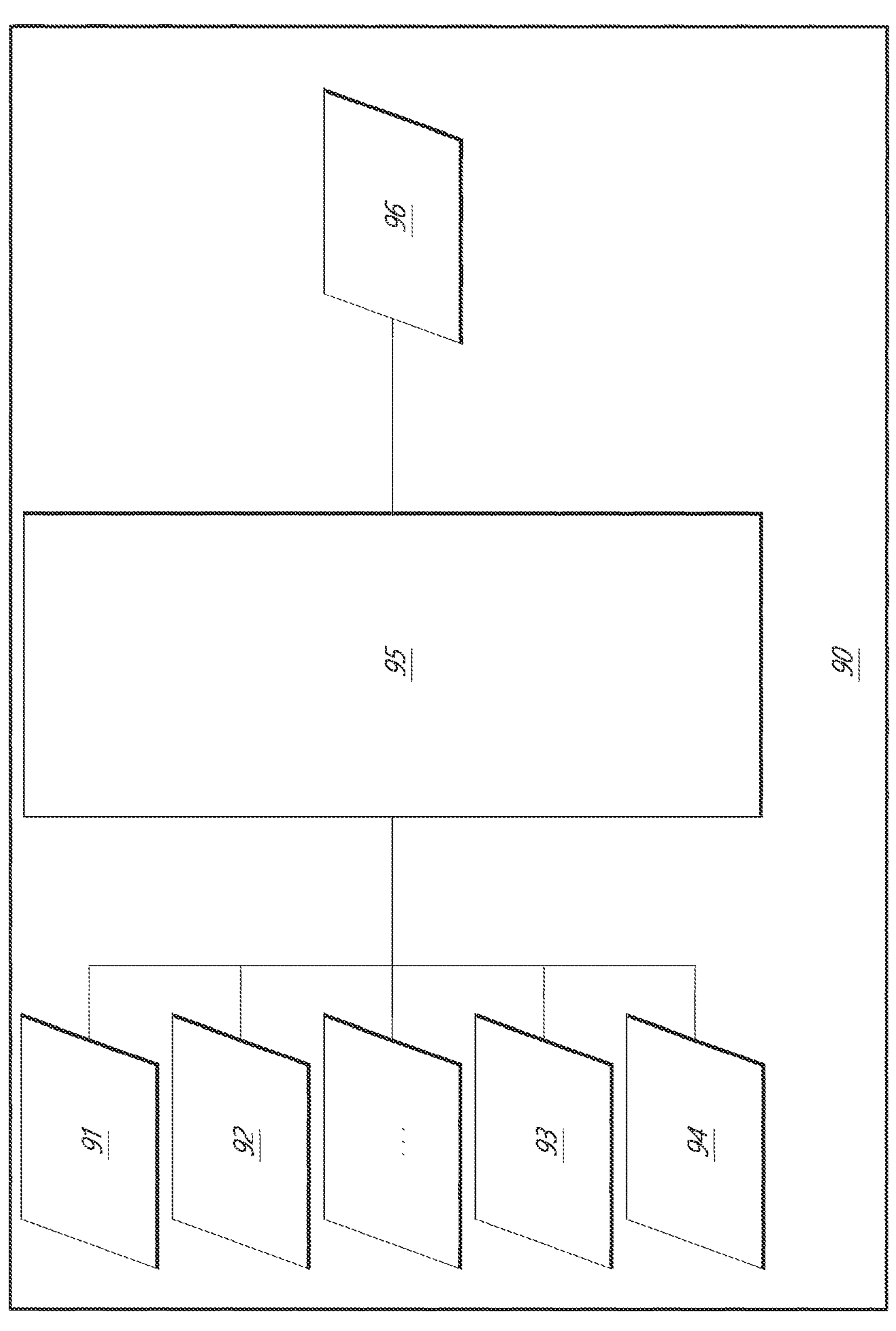
FIG. 20 depicts a block diagram illustrating a localization system that estimates a location of one or more elements of the robotic systems of FIGS. 1-10, such as the location of the instrument of FIGS. 16-18, in accordance to an example embodiment.

FIG. 20 is a block diagram illustrating a localization system 90 that estimates a location of one or more elements of the robotic system, such as the location of the instrument, in accordance to an example embodiment. The localization system 90 may be a set of one or more computer devices configured to execute one or more instructions. The computer devices may be embodied by a processor (or processors) and computer-readable memory in one or more components discussed above. By way of example and not limitation, the computer devices may be in the tower 30 shown in FIG. 1, the cart shown in FIGS. 1-4, the beds shown in FIGS. 5-14, etc.

As shown in FIG. 20, the localization system 90 may include a localization module 95 that processes input data 91-94 to generate location data 96 for the distal tip of a medical instrument. The location data 96 may be data or logic that represents a location and/or orientation of the distal end of the instrument relative to a frame of reference. The frame of reference can be a frame of reference relative to the anatomy of the patient or to a known object, such as an EM field generator (see discussion below for the EM field generator).

The various input data 91-94 are now described in greater detail. Pre-operative mapping may be accomplished through the use of the collection of low dose CT scans. Pre-operative CT scans are reconstructed into three-dimensional images, which are visualized, e.g. as "slices" of a cutaway view of the patient's internal anatomy. When analyzed in the aggregate, image-based models for anatomical cavities, spaces and structures of the patient's anatomy, such as a patient lung network, may be generated. Techniques such as center-line geometry may be determined and approximated from the CT images to develop a three-dimensional volume of the patient's anatomy, referred to as model data 91 (also referred to as "preoperative model data" when generated using only preoperative CT scans). The use of center-line geometry is discussed in U.S. patent application Ser. No. 14/523,760, the contents of which are herein incorporated in its entirety. Network topological models may also be derived from the CT-images, and are particularly appropriate for bronchoscopy.

In some embodiments, the instrument may be equipped with a camera to provide vision data 92. The localization module 95 may process the vision data to enable one or more vision-based location tracking. For example, the preoperative model data may be used in conjunction with the vision data 92 to enable computer vision-based tracking of the medical instrument (e.g., an endoscope or an instrument advance through a working channel of the endoscope). For example, using the preoperative model data 91, the robotic system may generate a library of expected endoscopic images from the model based on the expected path of travel of the endoscope, each image linked to a location within the model. Intra-operatively, this library may be referenced by the robotic system in order to compare real-time images captured at the camera (e.g., a camera at a distal end of the endoscope) to those in the image library to assist localization.

Other computer vision-based tracking techniques use feature tracking to determine motion of the camera, and thus the endoscope. Some features of the localization module 95 may identify circular geometries in the preoperative model data 91 that correspond to anatomical lumens and track the change of those geometries to determine which anatomical lumen was selected, as well as the relative rotational and/or translational motion of the camera. Use of a topological map may further enhance vision-based algorithms or techniques.

Optical flow, another computer vision-based technique, may analyze the displacement and translation of image pixels in a video sequence in the vision data 92 to infer camera movement. Examples of optical flow techniques may include motion detection, object segmentation calculations, luminance, motion compensated encoding, stereo disparity measurement, etc. Through the comparison of multiple frames over multiple iterations, movement and location of the camera (and thus the endoscope) may be determined.

The localization module 95 may use real-time EM tracking to generate a real-time location of the endoscope in a global coordinate system that may be registered to the patient's anatomy, represented by the preoperative model. In EM tracking, an EM sensor (or tracker) comprising of one or more sensor coils embedded in one or more locations and orientations in a medical instrument (e.g., an endoscopic tool) measures the variation in the EM field created by one or more static EM field generators positioned at a known location. The location information detected by the EM sensors is stored as EM data 93. The EM field generator (or transmitter), may be placed close to the patient to create a low intensity magnetic field that the embedded sensor may detect. The magnetic field induces small currents in the sensor coils of the EM sensor, which may be analyzed to determine the distance and angle between the EM sensor and the EM field generator. These distances and orientations may be intra-operatively "registered" to the patient anatomy (e.g., the preoperative model) in order to determine the geometric transformation that aligns a single location in the coordinate system with a position in the pre-operative model of the patient's anatomy. Once registered, an embedded EM tracker in one or more positions of the medical instrument (e.g., the distal tip of an endoscope) may provide real-time indications of the progression of the medical instrument through the patient's anatomy.

Robotic command and kinematics data 94 may also be used by the localization module 95 to provide localization data 96 for the robotic system. Device pitch and yaw resulting from articulation commands may be determined during pre-operative calibration. Intra-operatively, these calibration measurements may be used in combination with known insertion depth information to estimate the position of the instrument. Alternatively, these calculations may be analyzed in combination with EM, vision, and/or topological modeling to estimate the position of the medical instrument within the network.

As FIG. 20 shows, a number of other input data can be used by the localization module 95. For example, although not shown in FIG. 20, an instrument utilizing shape-sensing fiber can provide shape data that the localization module 95 can use to determine the location and shape of the instrument.

The localization module 95 may use the input data 91-94 in combination(s). In some cases, such a combination may use a probabilistic approach where the localization module 95 assigns a confidence weight to the location determined from each of the input data 91-94. Thus, where the EM data may not be reliable (as may be the case where there is EM interference) the confidence of the location determined by the EM data 93 can be decrease and the localization module 95 may rely more heavily on the vision data 92 and/or the robotic command and kinematics data 94.

As discussed above, the robotic systems discussed herein may be designed to incorporate a combination of one or more of the technologies above. The robotic system's computer-based control system, based in the tower, bed and/or cart, may store computer program instructions, for example, within a non-transitory computer-readable storage medium such as a persistent magnetic storage drive, solid state drive, or the like, that, upon execution, cause the system to receive and analyze sensor data and user commands, generate control signals throughout the system, and display the navigational and localization data, such as the position of the instrument within the global coordinate system, anatomical map, etc.

G. Secondary Brake Release Mechanisms

In accordance with some embodiments, a robotic system can be configured such that once in a power-off or fault state, the arms can generally be held in place via a braking mechanism (e.g., as "power-off brakes"). The braking mechanism can be located in and around the joints and links of the arm, thereby inhibiting movement of the arm.

The power-off brakes may be activated automatically by a controller or control system of the robotic system, such as upon triggering of a fault (e.g., if a sensor were to break) or upon loss of power to the system. In certain systems, these power-off brakes may be sufficient to maintain the arm in a given position while permitting the arm to be "back-drivable" by the user. When back-driven by the user, the user would apply a force greater than the force of the power-off break that is used to maintain a joint or link in a given position. As a result, the user would be able to articulate the arm to a given desired position even when the power-off brakes are activated in the arm. In addition, such robotic systems can include a primary brake release, which can be activated by the user and implemented by the controller or control system.

However, in certain robotic systems, including those described above, certain arms may be challenging to back-drive when a power-off brake is applied. The robotic system 200 can comprise a unique architecture in which components thereof include joints and brakes that are far sturdier than predicate counterparts. As noted above, these joints and brakes can be designed to support the very heavy weight of the robotic system's components, such as the table 202, the bar 204 and the arms 206, and cannot simply be overcome by manual force or otherwise backdriven, at least because they support heavy loads.

Figure 21:
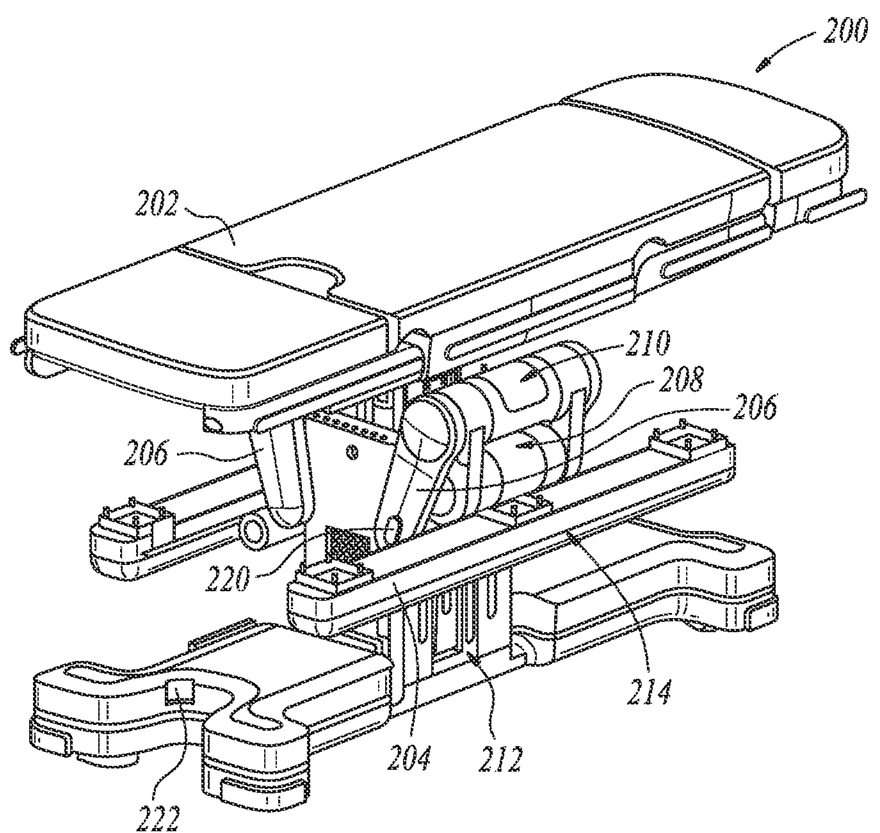
FIG. 21 illustrates a medical robotic system that can incorporate one or more secondary brake release mechanisms, in accordance with some embodiments.

Accordingly, FIG. 21 illustrates a robotic system 200 having a plurality of joints and linkages, as well as brake mechanisms that are incorporated into the system to control movement of the joints and/or linkages. In addition to a primary brake release that may be available to release the power-off brake system, as discussed above, some embodiments of the robotic system 200 can further comprise a novel secondary brake release mechanism that can allow the user to release the power-off brake to permit the user to, for example, more easily manipulate the position of a robotic arm while the system is in a power-off or faulted state.

The brake mechanisms of the robotic system 200 can be associated and/or coupled to various joints of the robotic system 200. For example, the robotic system 200 can include a D2 joint, shown as element 208, and a D3 joint, shown as element 210 (the joints that provide height and lateral positioning of the bar 204), DO and D1 joints, shown as element 212 (two joints that provide vertical or Z-life of the bar 204 and the arms 206), and the D7 joint, shown as element 214, that enables translation of the bar 204.

These and other joints may be designed to resist manual force such that they cannot simply be overcome by manual force upon a power shut off or fault. In accordance with some embodiments disclosed herein, the robotic system 200 can comprise a secondary brake release that can permit the user to override the brake mechanism associated with one or more of the joints 208, 210, 212, and 214. Advantageously, some embodiments of a secondary brake release that can permit the user to perform one of a variety of operations or procedures, including accessing a patient on the bed of the system, without impacting the connection between the power-off brake and the motor drive. Moreover, the integrity and function of the system can be more securely protected and maintained while providing flexibility to the user in operating the system.

In some embodiments, the robotic system 200 can be configured such that the joints comprise first and second portions that are movable relative to each other. The second portion can ultimately couple to a tool. The brake mechanism can selectively limit motion of the joint. The brake mechanism can have a braking material that is engageable between an engaged configuration and a disengaged configuration. In the engaged configuration, the braking material can limit a movement of the second portion of the joint relative to the first portion of the joint, and in the disengaged configuration, the braking material can permit the movement of the second portion of the joint relative to the first portion of the joint. The brake mechanism can also comprise an electromagnetic assembly that has a coil that can be energized to disengage the braking material from the engaged configuration to the disengaged configuration, thereby controlling a function of the brake mechanism.

Further, in accordance with some embodiments disclosed herein, the robotic system 200 can also comprise a user-commanded release mechanism that permits the user to disengage the braking mechanism independently of the electromagnetic assembly. Thus, the user-commanded release mechanism can serve as an alternative means to releasing one or more of the brake mechanisms of the robotic system 200.

The user-commanded release mechanism can comprise a release actuator. The release actuator can be mechanical, such as a button, lever, push plate, switch, and/or other such components. Further, the release actuator can be an electrical or electromechanical, such as an electromagnetic assembly and/or a backup battery. The release actuator can be a feature present on one or more components of the robotic system 200, such as may be present as a mechanical release button 220 or an electrical release button 222, both of which may be protected or hidden behind covers on the robotic system 200.

Figure 22:
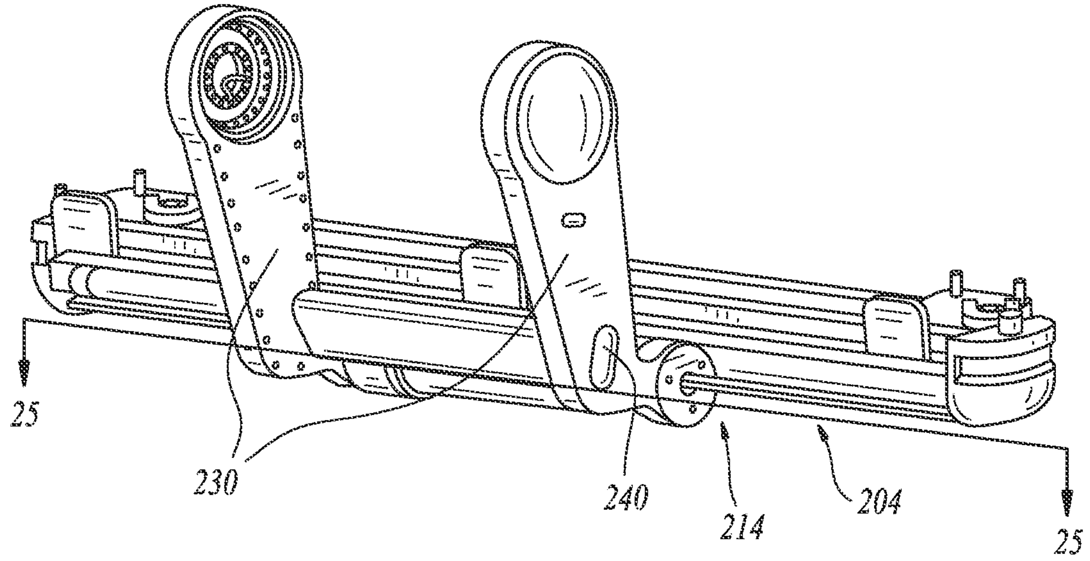
FIG. 22 illustrates a bar and a pair of arms of the system of FIG. 21, in accordance with some embodiments.

Referring now to FIGS. 22-25, an embodiment of a mechanical brake release mechanism can be incorporated into one or more joints of the robotic system 200. FIG. 22 illustrates the bar 204 coupled to a pair of linkages 230. The pair of linkages 230 can be coupled to the bar 204 via a rotatable joint. Further, the bar 204 can also comprise a translatable mechanism that allows portions of the bar to translate relative to the linkages 230.

In some embodiments, a mechanical brake release actuator 240 can be built into or supported on a component of the robotic system 200, such as one or more of the linkages 230, bars 204, and/or or bed 202. The actuator 240 can be operative to release a brake associated and/or coupled to one or more joints of the medical robotic system. In some embodiments, a mechanical brake release can be provided to release the brake mechanism that is associated and/or coupled to the D7 joint 214, which can enable translation of the adjustable bar 204 relative to the table 202.

Figure 23:
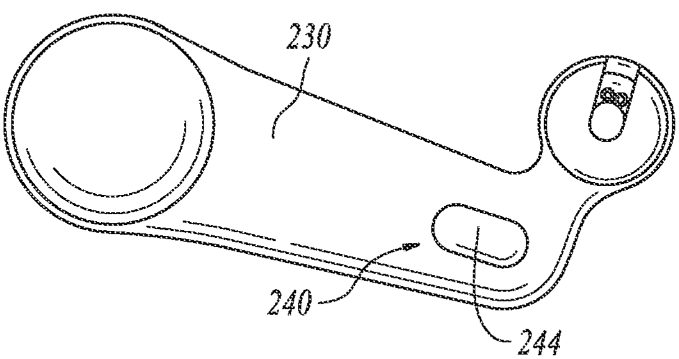
FIGS. 23 and 24 illustrate a cover of a release button of the secondary brake release mechanism, in accordance with some embodiments.
Figure 24:
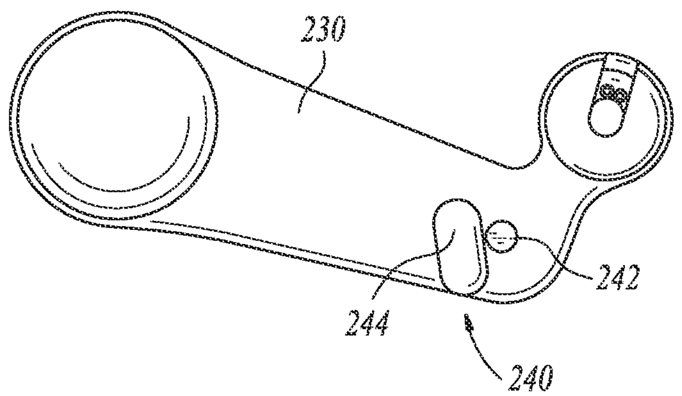

As shown in FIGS. 21-24, the actuator 240 can comprise a brake release button 242, which can trigger the release of the brake mechanism associated with the D7 joint 214. FIGS. 23 and 24 provide detailed views of the linkage 230 and the brake release button 242 that is concealed underneath a movable cover 244. The movable cover 244 can move from a closed position in FIG. 23 to an open position in FIG. 24. Once the movable cover 244 is in the open position, the user can actuate the brake release button 242.

H. Mechanical Brake Release Mechanisms

Figure 25:
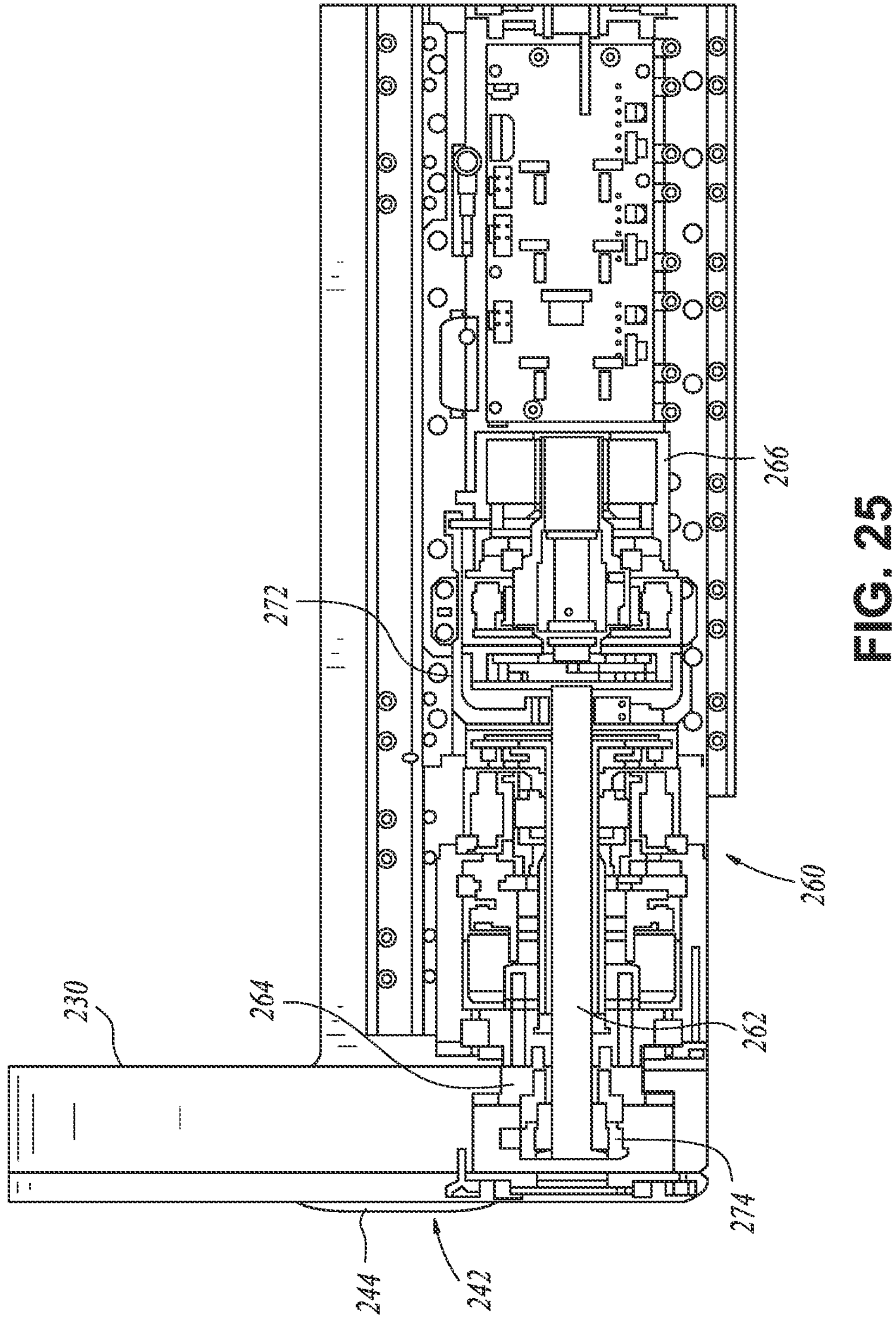
FIG. 25 is a cross-sectional view of the secondary brake release mechanism, in accordance with some embodiments.

FIGS. 25 and 26 illustrate aspects of a mechanical brake release mechanism 260 that can be incorporated into the robotic system 200. FIG. 25 illustrates a cross-sectional view taken along section lines 25-25 in FIG. 22.

In the embodiment illustrated in FIG. 25, the mechanical brake release mechanism 260 can comprise a shaft or release tube 262 and a distal mount shim block 264 that can be used to trigger release of the brake 266 upon actuation of the brake release button 242. In operation, the axial movement of the brake release button 242 can directly or indirectly cause or drive movement of the shaft 262, which can in turn contact and trigger release of the brake 266.

Optionally, the mechanical brake release mechanism 260 can comprise a release subassembly 270, as shown in FIGS. 26A-26C. The release subassembly 270 can comprise the shaft 262, a fork 272, and a lever 274. The lever 274 can be mounted at a first end 280 of the shaft 262, and the fork 272 can be mounted at a second end 282 of the shaft 262. The brake release button 242 (not shown in the cross-sectional view of FIG. 25, but whose position is indicated therein) can be positioned such that axial movement of the brake release button 242 causes movement of a contact end portion 290 of the lever 274 in a direction generally parallel relative to the axial movement of the brake release button 242. The movement of the lever 274 in a direction parallel relative to the longitudinal axis of the shaft 262 therefore causes movement of the shaft 262 along its longitudinal axis thereby driving movement of the fork 272. Further, steps or adjustment notches 292 of the fork 272 can contact, release, or otherwise interact with the brake 266 in order to trigger release of the brake 266.

In some embodiments, the shaft 262 can be operably coupled to the fork 272. The contact of the fork 272 against the brake 266 can be direct or indirect, and can push the brake 266 in a direction generally away from the shaft 262. However, the fork 272 may also function to trigger a disconnection or disengagement of the adjustment notches 272 from the brake 266.

I. Electrical Brake Release Mechanisms

In accordance with some embodiments, an electrical brake release mechanism can also or alternatively be used to release a brake mechanism associated with and/or coupled to one or more joints or links of a medical robotic system. Similar to mechanical brake release mechanisms, and electrical brake release mechanism can provide a level of safety and ease-of-use for the user when desiring to move the arms of the robotic system during a power-off or fault state.

The electrical brake release mechanism can comprise a battery back-up to provide redundancy even in case of system power failure. The electrical brake release mechanism could comprise a power source that is parallel to a brake coil of the brake mechanism, and/or a secondary solenoid coil in the brake that is completely parallel and separately actuated for further redundancy.

Figure 27:
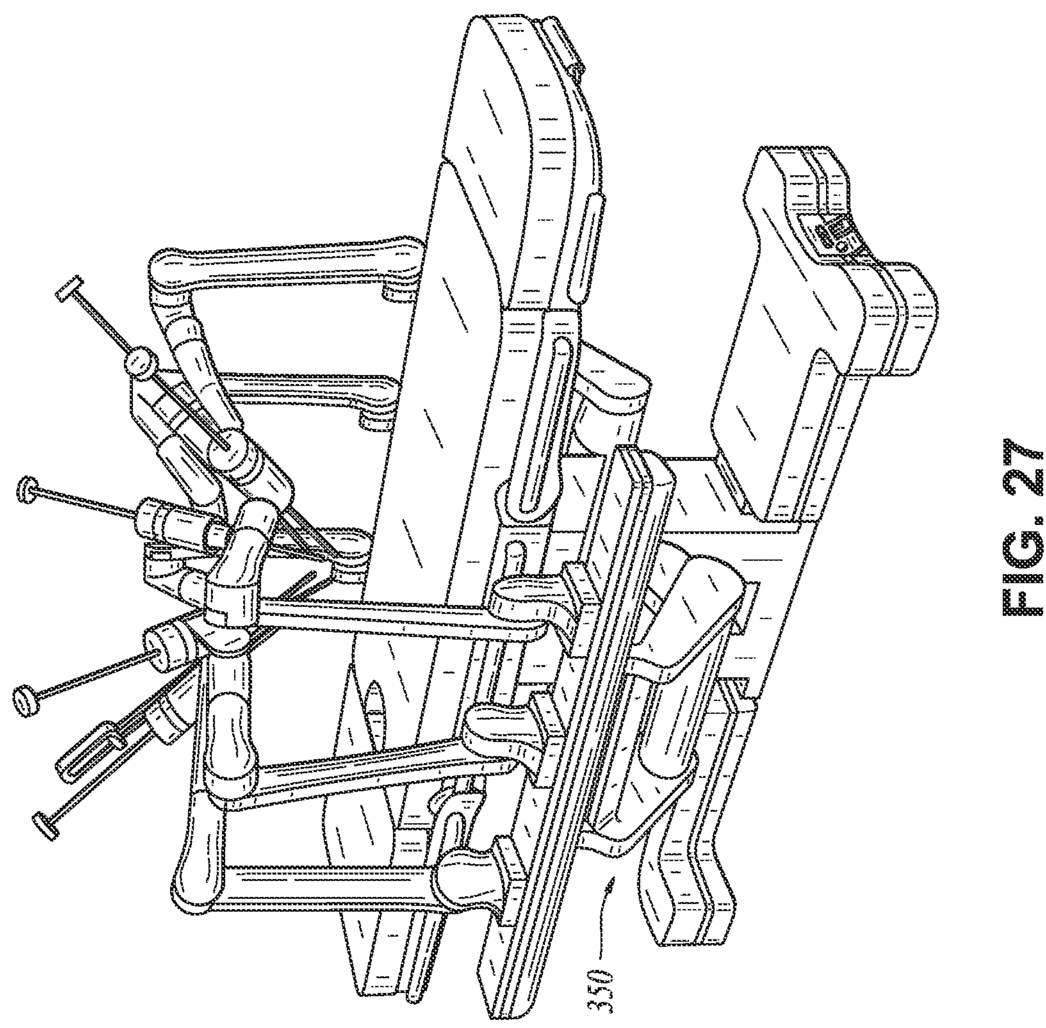
FIGS. 27 and 28 illustrate example robotic systems that incorporate an actuator for an electrical brake release mechanism, in accordance with some embodiments.
Figure 28:
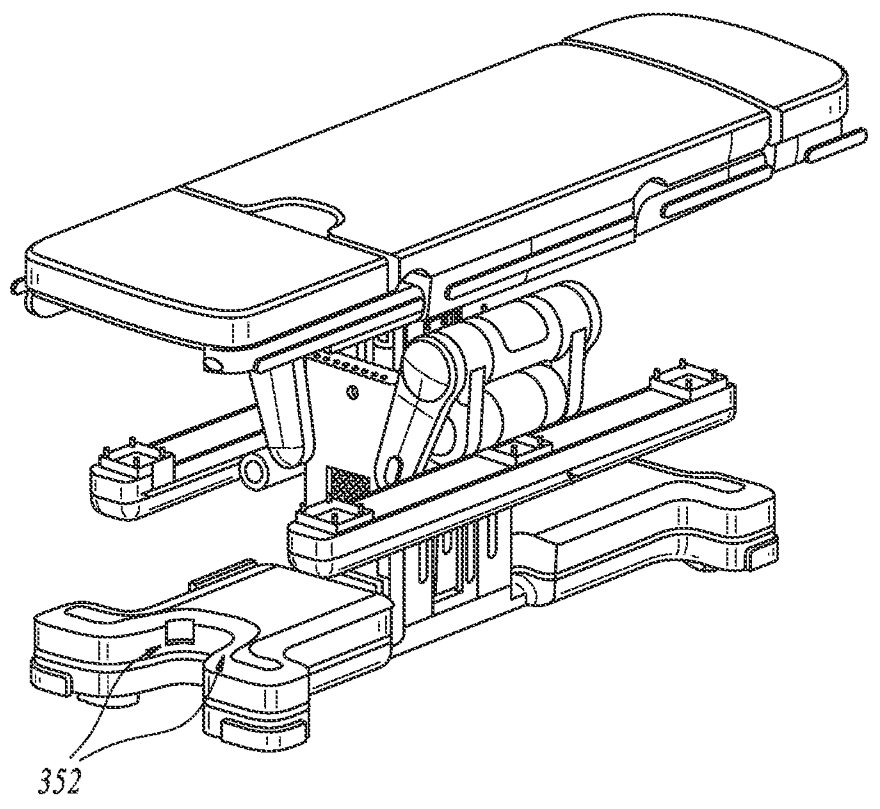

Referring now to FIGS. 27 and 28, embodiments of a robotic system are illustrated in which an electrical brake release mechanism is incorporated into the architecture of the robotic system. As with the mechanical brake release mechanism, some embodiments of the electrical brake release mechanism can comprise an actuator or release button that permits the user to release the brake mechanism. FIG. 27 illustrates that the actuator can be incorporated into an arm or linkage of the robotic system, as indicated by element number 350. FIG. 28 illustrates that the actuator or release button can be incorporated into a base of the robotic system, as indicated by element number 352.

As noted above with regard to the mechanical brake release mechanism, the discussion of which is incorporated herein by reference and will not be repeated for brevity, the actuators in embodiments of the electrical brake release mechanism can be incorporated into such components of the robotic system, enclosed within housings or protected by covers for providing accessibility to the user while facilitating safety and access thereto.

Figure 29:
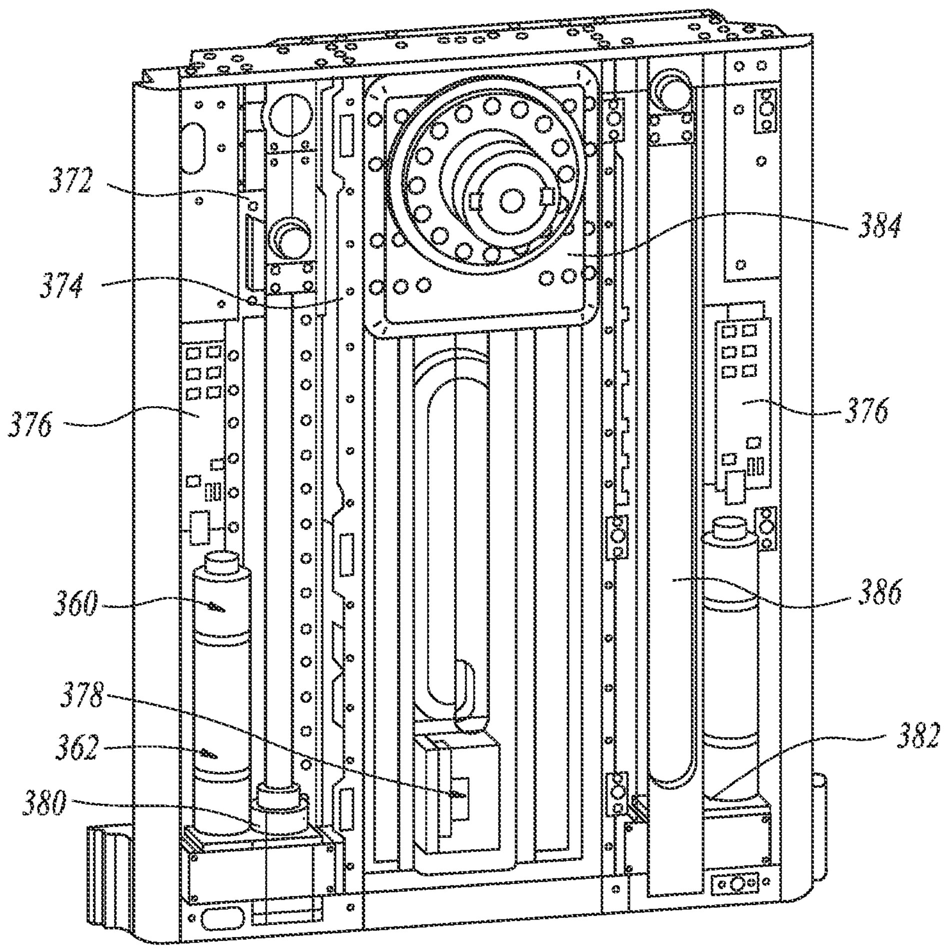
FIG. 29 is a cross-sectional side view of a joint of a robotic system that illustrates an electrical brake release mechanism, in accordance with some embodiments.

FIG. 29 illustrates a cross-sectional view of the D0 or D1 joint 212 of the robotic system 200, according to some embodiments. Shown as an example of joints or linkages that can be modified to include an electrical brake release mechanism, the brake mechanism of the joint 212 can respond to actuation of a release button of an electrical brake release mechanism.

For example, the electrical brake release mechanism can comprise a dual coil brake 360 that is positioned on a motor 362. The electrical brake release mechanism can also comprise a linear motion guide 372. The electrical brake release mechanism can also comprise an inductive linear encoder 374, circuit assemblies 376, 378 and/or other computer hardware to form a control assembly that can drive the functionality of the system.

In addition, actuators 310, 312 configured to control joints and/or brakes of the system in response to one or more signals generated by the control assembly of the system 300. In addition, other features, such as a center pivot linear motion guide 314 and a fluid ingress protection strip 316 into the system 300 for providing additional function and reliability to the operation of the system 300.

To provide vertical lift and pitch of the bar, a pair of linear actuators 380, 382 (e.g., a D0 actuator and D1 actuator) can be used to lift the set-up joints and the adjustable bar vertically. Upon entering a power-off or fault state, the dual coil brake 360 (which can comprise a pair of magnetic coils) can generate a magnetic field that overcomes a spring force of the actuators 380, 382, thereby preventing movement of the linear actuators 380, 382. Actuating the release button changes the magnetic field in the coils of the dual coil brake 360 and enables the D0/D1 joints to be reconfigured by manual force. Optionally, the brake 360 may be configured as a non-dual coil brake mechanism, such as a single coil or other such electrical circuits.

In accordance with some embodiments, the electrical brake release mechanism can comprise a battery back-up system that provides redundancy even in case of system power failure. The battery backup system may be coupled to and carried by the robotic system 200, such as being incorporated into a component thereof. The battery backup system can be a parallel power source to the same brake mechanism or coil or a secondary solenoid coil in the brake that is completely parallel and separately actuated for further redundancy.

3. Implementing Systems and Terminology

Implementations disclosed herein can advantageously provide systems, methods and apparatus for provide an added level of safety to a robot that interacts with humans, by allowing joints to be completely unlocked and repositioned even under complete electrical or software failure of the robot.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present inventions. Various modifications to these implementations will be readily apparent to those skilled in the art, and the generic principles defined herein may be applied to other implementations without departing from the scope of the inventions. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present inventions are not intended to be limited to the implementations shown herein but is to be accorded the widest scope consistent with the principles and novel features disclosed herein.

What is claimed is:

1. A medical robotic system comprising:
- a joint comprising:
  - a first portion; and
  - a second portion moveable relative to the first portion and configured to be coupled to a tool; and
- a brake mechanism configured to selectively limit motion of the joint, the brake mechanism comprising:
  - a braking material engageable between an engaged configuration and a disengaged configuration, wherein in the engaged configuration the braking material limits a movement of the second portion of the joint relative to the first portion of the joint, and in the disengaged configuration the braking material permits the movement of the second portion of the joint relative to the first portion of the joint;

a first electromagnetic assembly comprising a first coil, wherein the first electromagnetic assembly is configured to disengage the braking material from the engaged configuration to the disengaged configuration when the first coil is energized; and a user-commanded release mechanism comprising a release actuator, the release actuator comprising a release plate, wherein the release plate is movable to disengage the braking material from the engaged configuration to the disengaged configuration independent of the first electromagnetic assembly, permitting the movement of the second portion of the joint relative to the first portion of the joint, and a mechanical input coupled to the release plate, wherein actuation of the mechanical input moves the release plate independent of the first electromagnetic assembly.

2. The medical robotic system of claim 1, wherein the second portion of the joint is rotatable relative to the first portion of the joint.

3. The medical robotic system of claim 1, wherein the second portion of the joint is translatable relative to the first portion of the joint.

4. The medical robotic system of claim 1, wherein the first coil is selectively energized by a control system.

5. The medical robotic system of claim 4, further comprising a motorized actuator coupled to the first portion and the second portion, wherein the motorized actuator is configured to move the second portion relative to the first portion when the motorized actuator is energized.

6. The medical robotic system of claim 5, wherein the motorized actuator of the joint is selectively energized by the control system.

7. A medical robotic system comprising:

a joint comprising:

a first portion; and a second portion moveable relative to the first portion and configured to be coupled to a tool;

a brake mechanism configured to selectively limit motion of the joint, the brake mechanism comprising:

a braking material engageable between an engaged configuration and a disengaged configuration, wherein in the engaged configuration the braking material limits a movement of the second portion of the joint relative to the first portion of the joint, and in the disengaged configuration the braking material permits the movement of the second portion of the joint relative to the first portion of the joint;

a first electromagnetic assembly comprising a first coil, wherein the first electromagnetic assembly is configured to disengage the braking material from the engaged configuration to the disengaged configuration when the first coil is energized; and a second electromagnetic assembly comprising a second coil, wherein the second electromagnetic assembly is configured to disengage the braking material from the engaged configuration to the disengaged configuration when the second coil is energized, and the second coil is electrically independent from the first coil; and a user-commanded release mechanism comprising a release actuator and a mechanical input coupled to the release actuator, the mechanical input operable to move the release actuator independent of the first electromagnetic assembly and the second electromagnetic assembly, the movement of the release actuator disengaging the braking material from the engaged configuration to the disengaged configuration independent of the first electromagnetic assembly and the second electromagnetic assembly.

8. The medical robotic system of claim 7, wherein the second portion of the joint is rotatable relative to the first portion of the joint.

9. The medical robotic system of claim 7, wherein the second portion of the joint is translatable relative to the first portion of the joint.

10. The medical robotic system of claim 7, wherein the first coil is selectively energized by a control system.

11. The medical robotic system of claim 7, further comprising a switch, wherein the second coil is energized by actuating the switch.

12. The medical robotic system of claim 7, the release actuator comprising a lever that is movable to disengage the braking material from the engaged configuration to the disengaged configuration.

13. A method of operating a medical robotic system, the method comprising:

energizing a first coil of a brake mechanism coupled to a joint to permit a movement of a second portion of the joint relative to a first portion of the joint;

energizing a motorized actuator to move the second portion of the joint relative to the first portion of the joint;

deenergizing the first coil of the brake mechanism to engage the brake mechanism and to limit the movement of the second portion of the joint relative to the first portion of the joint; and releasing the brake mechanism via a release actuator and a mechanical input to permit the movement of the second portion of the joint relative to the first portion of the joint, the mechanical input coupled to the release actuator, the brake mechanism being released upon actuation of the mechanical input that moves the release actuator without energizing the first coil of the brake mechanism.

14. The method of claim 13, further comprising rotating the second portion of the joint relative to the first portion of the joint.

15. The method of claim 13, further comprising translating the second portion of the joint relative to the first portion of the joint.

16. The method of claim 13, further comprising deenergizing a second coil of the brake mechanism.

17. The method of claim 13, further comprising moving a release plate to disengage the brake mechanism and permit the movement of the second portion of the joint relative to the first portion of the joint without energizing the first coil of the brake mechanism.

18. The method of claim 13, further comprising energizing the motorized actuator of the joint and the first coil of the brake mechanism via a common control system.

19. The method of claim 13, further comprising energizing a second coil of the brake mechanism to disengage the brake mechanism and permit the movement of the second portion of the joint relative to the first portion of the joint, without energizing the first coil of the brake mechanism.

20. The method of claim 13, the release actuator comprising a lever coupled to the mechanical input, the lever being moved upon actuation of the mechanical input without energizing the first coil of the brake mechanism.

* * * * *